US010602494B2

(12) United States Patent
Shimezawa et al.

(10) Patent No.: US 10,602,494 B2
(45) Date of Patent: Mar. 24, 2020

(54) TERMINAL DEVICE, BASE STATION DEVICE, AND COMMUNICATION METHOD

(71) Applicant: Sharp Kabushiki Kaisha, Sakai, Osaka (JP)

(72) Inventors: Kazuyuki Shimezawa, Sakai (JP); Naoki Kusashima, Sakai (JP); Alvaro Ruiz Delgado, Sakai (JP); Kimihiko Imamura, Sakai (JP); Shoichi Suzuki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 107 days.

(21) Appl. No.: 15/546,469

(22) PCT Filed: Jan. 18, 2016

(86) PCT No.: PCT/JP2016/051328
§ 371 (c)(1),
(2) Date: Jul. 26, 2017

(87) PCT Pub. No.: WO2016/121560
PCT Pub. Date: Aug. 4, 2016

(65) Prior Publication Data
US 2018/0279264 A1     Sep. 27, 2018

(30) Foreign Application Priority Data

Jan. 29, 2015    (JP) .................................. 2015-014963

(51) Int. Cl.
*H04W 72/04*     (2009.01)
*H04W 16/14*     (2009.01)
(Continued)

(52) U.S. Cl.
CPC ........... *H04W 72/042* (2013.01); *H04L 5/001* (2013.01); *H04L 5/0044* (2013.01);
(Continued)

(58) Field of Classification Search
CPC ............... H04W 72/042; H04W 72/04; H04W 72/0446; H04W 72/10; H04W 72/0413;
(Continued)

(56) References Cited

U.S. PATENT DOCUMENTS

2012/0269151 A1* 10/2012 Lee, II .................. H04L 5/0007
370/329
2013/0329711 A1* 12/2013 Seo ....................... H04J 11/0069
370/336

(Continued)

OTHER PUBLICATIONS

Source: Ericsson, Qualcomm, Huawei, Alcatel-Lucent; Title: Study on Licensed-Assisted Access using LTE; 3GPP TSG RAN Meeting #65, Edinburgh, Scotland, Sep. 9-12, 2014; RP-141664; Document for: Approval, Agenda Item: 14.1.1.

(Continued)

*Primary Examiner* — Un C Cho
*Assistant Examiner* — Rasha K Fayed
(74) *Attorney, Agent, or Firm* — ScienBiziP, P.C.

(57) ABSTRACT

A cell using an unallocated frequency band or a shared frequency band is efficiently controlled. A terminal device includes a reception unit configured to receive a physical downlink control channel (PDCCH) in a secondary cell having a frame structure type 3. Upon the terminal device detecting, in the secondary cell having the frame structure type 3, the PDCCH having downlink control information (DCI) in a subframe n, the terminal device assumes a configuration of occupied OFDM symbols in the secondary cell in accordance with a field in the DCI detected in the subframe n.

12 Claims, 7 Drawing Sheets

(51) Int. Cl.
*H04W 28/06* (2009.01)
*H04L 27/00* (2006.01)
*H04L 5/00* (2006.01)
*H04L 27/26* (2006.01)
*H04L 5/14* (2006.01)

(52) U.S. Cl.
CPC ...... *H04L 27/0006* (2013.01); *H04L 27/2626* (2013.01); *H04W 16/14* (2013.01); *H04W 28/06* (2013.01); *H04W 72/04* (2013.01); *H04W 72/0446* (2013.01); *H04L 5/0053* (2013.01); *H04L 5/1469* (2013.01)

(58) Field of Classification Search
CPC ......... H04W 72/0473; H04W 72/0453; H04W 72/0406; H04W 72/12; H04W 16/14; H04W 28/06; H04W 24/08; H04W 24/10; H04W 74/0841; H04W 74/006; H04W 74/0808; H04W 74/08; H04W 4/70; H04W 4/005; H04L 1/0027; H04L 1/1671; H04L 1/0023; H04L 1/0028; H04L 1/1896; H04L 5/001; H04L 5/0044; H04L 5/0053; H04L 5/1469; H04L 5/14; H04L 5/0091; H04L 5/0055; H04L 5/0073; H04L 5/0048; H04L 5/0078; H04L 5/0057; H04L 5/0092; H04L 5/0041; H04L 5/0007; H04L 5/0023; H04L 5/005

USPC ................................... 370/329, 328, 338, 35
See application file for complete search history.

(56) References Cited

U.S. PATENT DOCUMENTS

| | | | | |
|---|---|---|---|---|
| 2014/0112289 | A1* | 4/2014 | Kim | H04W 16/14 370/329 |
| 2014/0126531 | A1* | 5/2014 | Kang | H04L 5/0053 370/330 |
| 2015/0003407 | A1* | 1/2015 | Seo | H04L 25/0224 370/330 |
| 2016/0286558 | A1* | 9/2016 | Chae | H04L 5/0055 |
| 2017/0215202 | A1* | 7/2017 | Yang | H04L 5/0048 |
| 2017/0311320 | A1* | 10/2017 | Lunttila | H04L 5/001 |

OTHER PUBLICATIONS

3rd Generation Partnership Project; Technical Specification Group Radio Access Network; Evolved Universal Terrestrial Radio Access (E-UTRA); Physical layer procedures (Release 12); 3GPP TS 36.213 V12.4.0 (Dec. 2014).
Source: CATT; Title: Listen before talk for LAA; 3GPP TSG RAN WG1 Meeting #79, San Francisco, USA, Nov. 17-21, 2014; R1-144625 ; Document for: discussion.
Source: Alcatel-Lucent Shanghai Bell, Alcatel-Lucent ; Title: LBT enhancements for licensed-assisted access; 3GPP TSG RAN WG1 Meeting #79, San Francisco, USA, Nov. 17-21, 2014; R1-144701 ; Document for: Discussion/Decision.

* cited by examiner

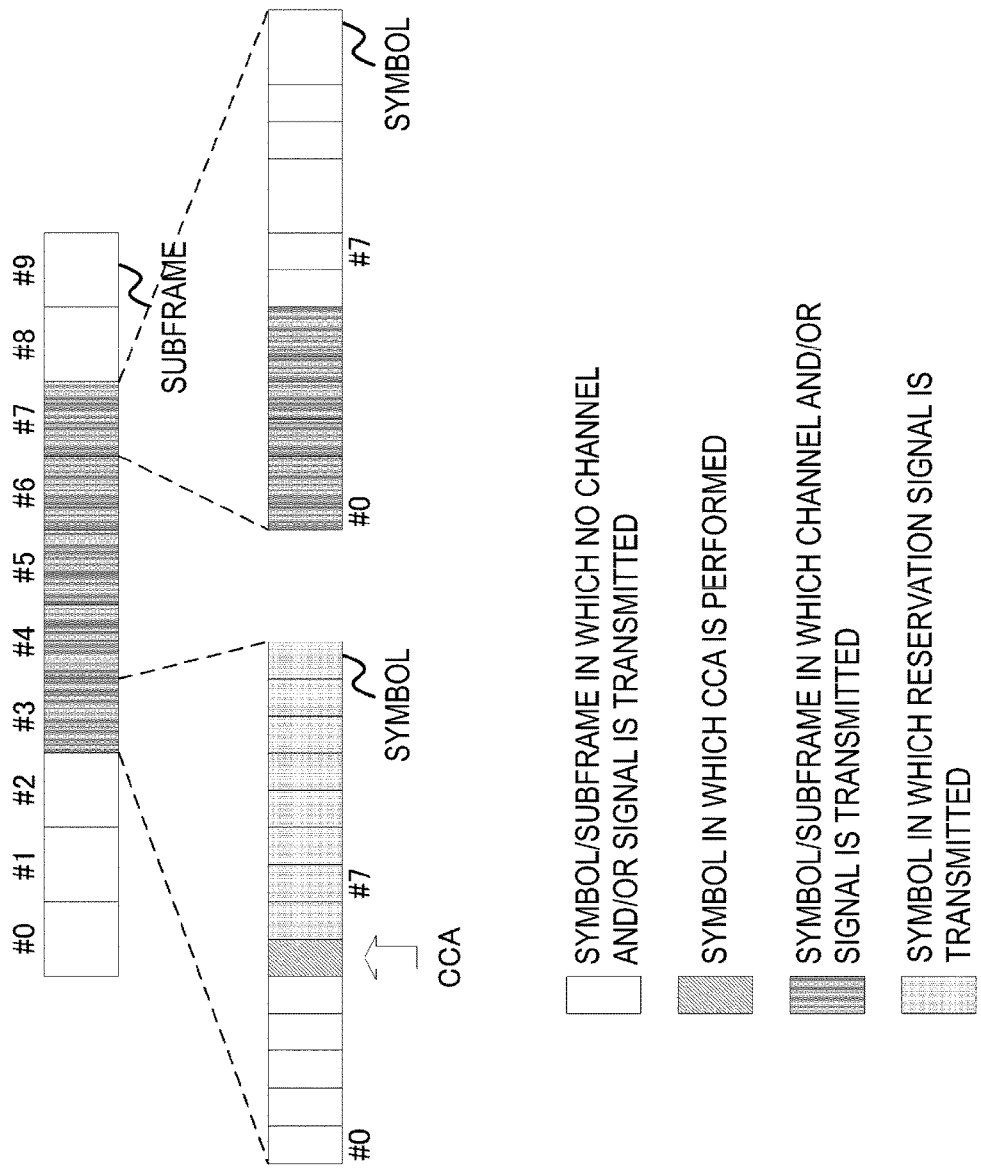

TERMINAL DEVICE, BASE STATION DEVICE, AND COMMUNICATION METHOD

TECHNICAL FIELD

Embodiments of the present invention relate to a technique of a terminal device, a base station device, and a communication method that enable efficient communication.

BACKGROUND ART

The 3rd Generation Partnership Project (3GPP), which is a standardization project, standardized the Evolved Universal Terrestrial Radio Access (hereinafter referred to as "E-UTRA"), in which high-speed communication is realized by adopting an orthogonal frequency-division multiplexing (OFDM) communication scheme and flexible scheduling using a unit of prescribed frequency and time called resource block.

Moreover, the 3GPP discusses Advanced E-UTRA, which realizes higher-speed data transmission and has upper compatibility with E-UTRA. The E-UTRA is a communication system based on a network in which base station devices have substantially the same cell constitution (cell size), and on the other hand, in the Advanced E-UTRA, discussion is made on a communication system based on a network (different-type radio network, heterogeneous network) in which base station devices (cells) having different constitutions coexist in the same area. Note that, the E-UTRA is also referred to as "LTE (Long Term Evolution)", and the Advanced E-UTRA is also referred to as "LTE-Advanced." Moreover, LTE can be a general term including LTE-Advanced.

In a communication system where cells (macro cells) having large cell radii and cells (small cells) having smaller cell radii than those of the macro cells coexist as in a heterogeneous network, a carrier aggregation (CA) technique and a dual connectivity (DC) technique are regulated in which a terminal device performs communication by connecting to a macro cell and a small cell at the same time (NPL 1).

Meanwhile, in NPL 2, discussion is made on Licensed-Assisted Access (LAA). In the LAA, an unallocated frequency band (unlicensed spectrum) used by a local area network is used for LTE, for example. Specifically, the unallocated frequency band is configured as a secondary cell (secondary component carrier). The secondary cell used as the LAA is assisted in connection, communication and/or configuration, by a primary cell (primary component carrier) configured in an allocated frequency band (licensed spectrum). The frequency band available in LTE is extended by the LAA, and hence, broadband transmission is possible. Noted that the LAA is also used in a shared frequency band (shared spectrum) shared among predetermined operators.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 12), 3GPP TS 36.213 V12.4.0 (2014-12).

NPL 2: RP-141664, Ericsson, Qualcomm, Huawei, Alcatel-Lucent, "Study on Licensed-Assisted Access using LTE," 3GPP TSG RAN Meeting #65, September 2014.

SUMMARY OF INVENTION

Technical Problem

In the LAA, when an unallocated frequency band or a shared frequency band is used, the frequency band will be shared with other systems and/or other operators. However, LTE is designed on the assumption of use in an allocated frequency band or in an unshared frequency band. Therefore, a conventional LTE cannot be used in an unallocated frequency band or in a shared frequency band.

The present invention has been made in view of the above-described respects, and an object of the present invention is to provide a terminal device, a base station device, and a communication method that enable efficient control of cells using an unallocated frequency band or a shared frequency band.

Solution to Problem (1) To accomplish the object described above, the present invention is contrived to provide the following means. That is, a terminal device according to an aspect of the present invention includes a reception unit configured to receive a physical downlink control channel (PDCCH) in a secondary cell having a frame structure type 3. If the terminal device detects, in the secondary cell having the frame structure type 3, the PDCCH having downlink control information (DCI), in a subframe n, the terminal device assumes a configuration of occupied OFDM symbols in the secondary cell in accordance with a field in the DCI detected in the subframe n.

(2) Furthermore, a base station device according to an aspect of the present invention includes a transmission unit configured to transmit a physical downlink control channel (PDCCH) in a secondary cell having a frame structure type 3. The base station device configures, in the secondary cell having the frame structure type 3, occupied OFDM symbols in the secondary cell in accordance with a field in DCI of the PDCCH transmitted in the subframe n.

(3) Furthermore, a communication method according to an aspect of the present invention is used in a terminal device. The method includes the steps of: receiving a physical downlink control channel (PDCCH) in a secondary cell having a frame structure type 3; and assuming, in the secondary cell having the frame structure type 3, if the terminal device detects the PDCCH having downlink control information (DCI) in a subframe n, a configuration of occupied OFDM symbols in the secondary cell in accordance with a field in the DCI detected in the subframe n.

(4) Furthermore, a communication method according to an aspect of the present invention is used in a base station device. The method includes the steps of: transmitting a physical downlink control channel (PDCCH) in a secondary cell having a frame structure type 3; and configuring, in the secondary cell having the frame structure type 3, occupied OFDM symbols in the secondary cell in according with a field in the DCI of the PDCCH transmitted in the subframe n.

(5) Furthermore, an integrated circuit according to an aspect of the present invention is provided in a terminal device. The integrated circuit is configured to at least execute a function of receiving a physical downlink control channel (PDCCH) in a secondary cell having a frame structure type 3. The function includes assuming, in the secondary cell having the frame structure type 3, if the terminal device detects the PDCCH having downlink control information (DCI) in a subframe n, a configuration of occupied OFDM symbols in the secondary cell in accordance with a field in the DCI detected in the subframe n.

(6) Furthermore, an integrated circuit according to an aspect of the present invention is provided in a base station device. The integrated circuit is configured to at least execute a function of transmitting a physical downlink control channel (PDCCH) in a secondary cell having a frame structure type 3. The function includes configuring, in the secondary cell having the frame structure type 3, occupied OFDM symbols in the secondary cell in accordance with a field in DCI of the PDCCH transmitted in the subframe n.

Advantageous Effects of Invention

According to the present invention, it is possible to improve transmission efficiency in a radio communication system in which a base station device and a terminal device communicate.

BRIEF DESCRIPTION OF DRAWINGS

FIG. 7 is a diagram illustrating an example of a communication procedure in an LAA cell according to the present embodiment.

DESCRIPTION OF EMBODIMENTS

First Embodiment

A first embodiment of the present invention will be described below. Description will be given by using a communication system (cellular system) in which a base station device (a base station, NodeB, or eNodeB (eNB)) and a terminal device (a terminal, a mobile station, a user device, or a user equipment (UE)) communicate in a cell.

A main physical channel and a physical signal used in EUTRA and Advanced EUTRA will be described. The "channel" means a medium used to transmit a signal, and the "physical channel" means a physical medium used to transmit a signal. In the present embodiment, the "physical channel" may be used as a synonym of "signal." In the future EUTRA and Advanced EUTRA, the physical channel may be added or the constitution and format type thereof may be changed or added; however, the description of the present embodiment will not be affected even if the channel is changed or added.

In the EUTRA and the Advanced EUTRA, scheduling of a physical channel or a physical signal is managed by using a radio frame. A single radio frame corresponds to 10 ms, and a single radio frame is constituted of 10 subframes. In addition, a single subframe is constituted of two slots (i.e., a single subframe corresponds to 1 ms, and a single slot corresponds to 0.5 ms). Moreover, scheduling is managed by using a resource block as a minimum unit of scheduling for allocating a physical channel. The "resource block" is defined by a certain frequency domain constituted of a set of a plurality of subcarriers (e.g., 12 subcarriers) on a frequency axis and a region constituted of a certain transmission time slot (one slot).

Figure 1:
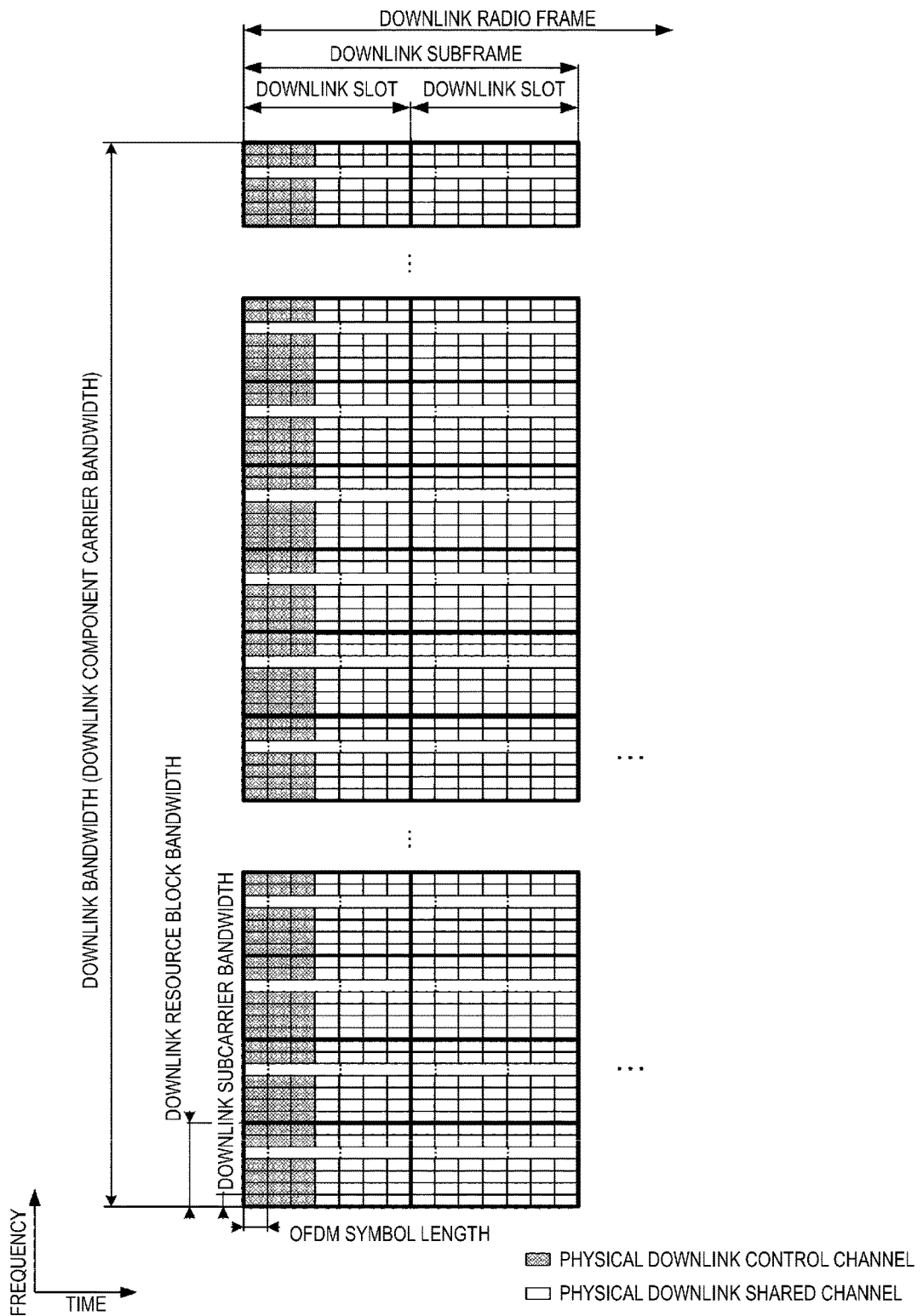
FIG. 1 is a diagram illustrating an example of a structure of a downlink radio frame according to the present embodiment.

FIG. 1 is a diagram illustrating an example of a structure of a downlink radio frame according to the present embodiment. The downlink uses an OFDM access scheme. In the downlink, a PDCCH, an EPDCCH, a physical downlink shared channel (PDSCH), and the like are allocated. A downlink radio frame is constituted by a downlink resource block (RB) pair. This downlink RB pair is a unit for allocation of a downlink radio resource and the like and is based on the frequency band of a predefined width (RB bandwidth) and a time duration (two slots=1 subframe). A single downlink RB pair is constituted by two downlink RBs (RB bandwidth×slot) that are consecutive RBs in the time domain. Each of the downlink RBs is constituted by 12 subcarriers in the frequency domain. In the time domain, the downlink RB is constituted by seven OFDM symbols when a normal cyclic prefix is added, while the downlink RB is constituted by six OFDM symbols when a cyclic prefix that is longer than the normal cyclic prefix is added. A region defined by a single subcarrier in the frequency domain and a single OFDM symbol in the time domain is referred to as "resource element (RE)." A physical downlink control channel is a physical channel on which downlink control information such as a terminal device identifier, physical downlink shared channel scheduling information, physical uplink shared channel scheduling information, and a modulation scheme, a coding rate, and a retransmission parameter are transmitted. Note that, although a downlink subframe in a single component carrier (CC) is described here, a downlink subframe is defined for each CC and downlink subframes are approximately synchronized between CCs.

Although not illustrated here, synchronization signals, a physical broadcast channel, or a downlink reference signal (RS) may be allocated to a downlink subframe. Examples of the downlink reference signal include a cell-specific reference signal (CRS: cell-specific RS), which is transmitted through the same transmission port as that for a PDCCH, a channel state information reference signal (CSI-RS), which is used to measure channel state information (CSI), a terminal-specific reference signal (URS: UE-specific RS), which is transmitted through the same transmission port as that for one or some PDSCHs, and a demodulation reference signal (DMRS), which is transmitted through the same transmission port as that for an EPDCCH. Moreover, carriers to which no CRS is allocated may be used. In this case, a signal (referred to as "enhanced synchronization signal") similar to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals. Moreover, a terminal-specific reference signal transmitted through the same transmission port as that of one or some PDSCHs is also referred to as "terminal-specific reference signal associated with the PDSCH" or a "DMRS." Moreover, a demodulation reference signal transmitted through the same transmission port as that of an EPDCCH is also referred to as "DMRS associated with the EPDCCH".

Although not illustrated here, a discovery signal (DS) may be allocated to a downlink subframe. In a cell, a DS Occasion (DS) is constituted of a time period (DS duration) having the predetermined number of consecutive subframes. The predetermined number is from 1 to 5 in FDD (frame structure type 1), and from 2 to 5 in TDD (frame structure type 2). The predetermined type is configured by RRC signaling. Moreover, the DS duration or the configuration thereof is also referred to as "discovery signals measurement timing configuration (DMTC)." A terminal assumes that the DS is transmitted (mapped, or generated), for each subframe configured with a parameter dmtc-Periodicity configured by the RRC signaling. Moreover, in a downlink subframe, the terminal assumes an existence of a DS which is constituted by including the following signals.

(1) A CRS at antenna port 0 within a DwPTS of all downlink subframes and all special subframes in the DS duration.

(2) In FDD, a PSS within the first subframe in the DS duration. In TDD, a PSS within the second subframe in the DS duration.

(3) An SSS within the first subframe in the DS duration.

(4) A non zero power CSI-RS within zero or more subframes in the DS duration. The non zero power CSI-RS is configured by RRS signaling.

A terminal performs measurement on the basis of the configured DS. The measurement is performed by using a CRS in the DS or a non zero power CSI-RS in the DS. Moreover, in the configuration related to the DS, a plurality of non zero power CSI-RSs can be configured.

Figure 2:
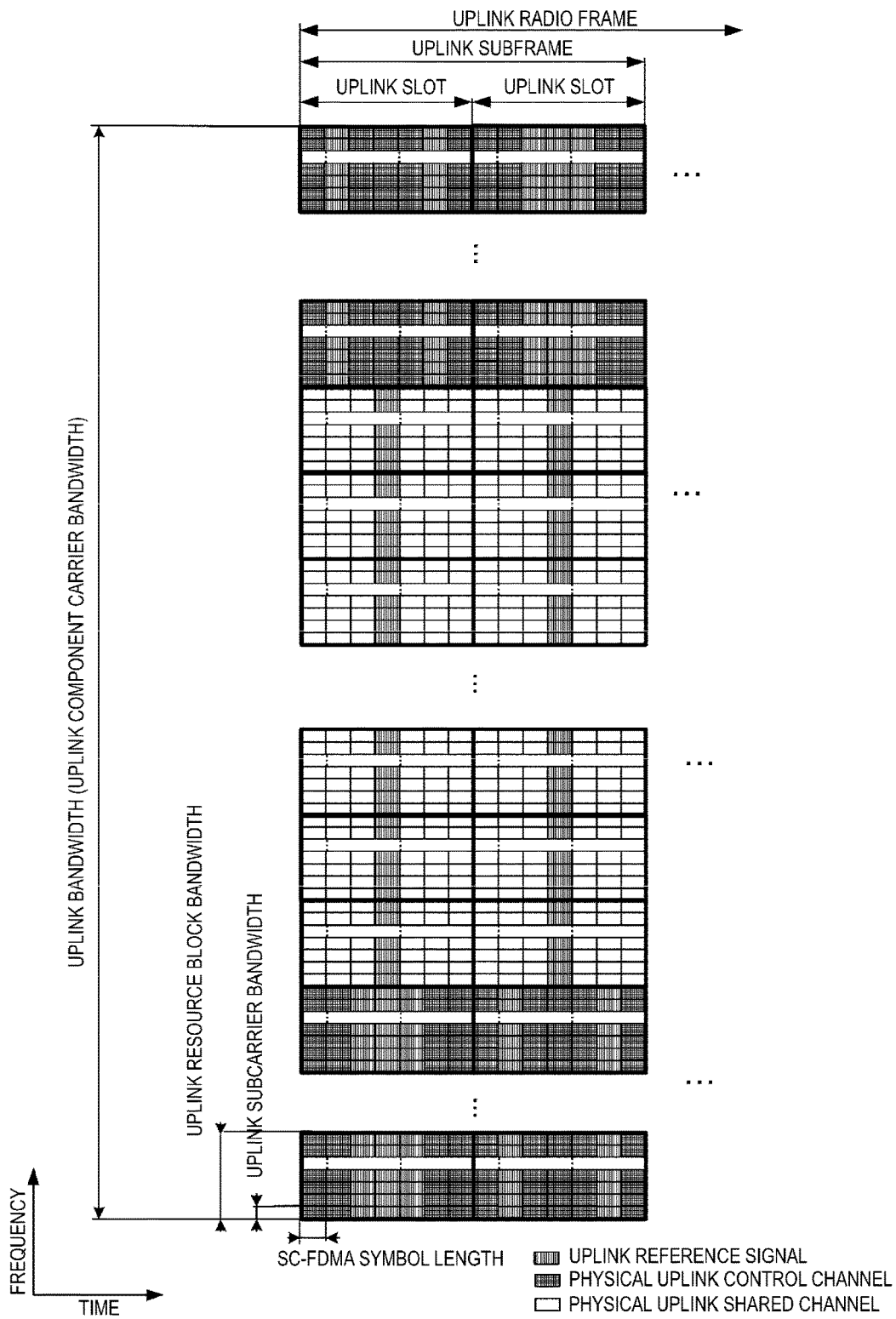
FIG. 2 is a diagram illustrating an example of a structure of an uplink radio frame according to the present embodiment.

FIG. 2 is a diagram illustrating an example of a structure of an uplink radio frame according to the present embodiment. The uplink uses a SC-FDMA scheme. In the uplink, a physical uplink shared channel (PUSCH), a PUCCH, and the like are allocated. An uplink reference signal is allocated to one or some of PUSCHs and PUCCHs. An uplink radio frame is constituted by an uplink RB pair. This uplink RB pair is a unit for allocation of uplink radio resources and the like and is constituted of the frequency band of a predefined width (RB bandwidth) and a predetermined time duration (two slots=1 subframe). A single uplink RB pair is constituted by two uplink RBs (RB bandwidth×slots) that are consecutive RBs in the time domain. Each of the uplink RBs is constituted by 12 subcarriers in the frequency domain. In the time domain, the uplink RB is constituted by seven SC-FDMA symbols when a normal cyclic prefix is added, while the uplink RB is constituted by six SC-FDMA symbols when a cyclic prefix that is longer than the normal cyclic prefix is added. Note that, although an uplink subframe in a single CC is described here, an uplink subframe is defined for each CC.

A synchronization signal includes three kinds of primary synchronization signals and secondary synchronization signals constituted by 31 kinds of codes that are interleaved in the frequency domain. 504 patterns of cell identifiers (physical cell identities; PCIs) for identifying base station devices, and frame timing for radio synchronization are indicated by the combinations of the primary synchronization signals and the secondary synchronization signals. The terminal device identifies the physical cell ID of a received synchronization signal by cell search.

The physical broadcast channel (PBCH) is transmitted for the notification (configuration) of a control parameter (broadcast information i.e., system information) commonly used among the terminal devices within the cell. The radio resource in which broadcast information is transmitted is notified on the physical downlink control channel to the terminal devices in the cell. Broadcast information not notified on the physical broadcast channel is transmitted, as a layer-3 message (system information) for notifying the broadcast information on the physical downlink shared channel, by the notified radio resource.

Examples of broadcast information to be notified include a cell global identifier (CGI), which indicates a cell-specific identifier, a tracking area identifier (TAI) for managing standby areas in paging, random access configuration information (such as a transmission timing timer), and shared radio resource configuration information, neighboring cell information and uplink access control information on the cell.

A downlink reference signal is classified into a plurality of types according to applications thereof. For example, cell-specific reference signals (cell-specific RSs) are pilot signals transmitted with prescribed power from each cell and are downlink reference signals periodically repeated in the frequency domain and the time domain under a prescribed rule. The terminal device receives the cell-specific RS and thereby measures the reception quality of each cell. The terminal device also uses a cell-specific RS as a reference signal for demodulation of a physical downlink control channel or a physical downlink shared channel transmitted at the same time as the cell-specific RS. The sequence used for a cell-specific RS is a sequence distinguishable among the cells.

The downlink reference signal is also used for estimation for downlink channel variation. A downlink reference signal used for estimation for channel variations is referred to as "channel state information reference signal (CSI-RS)." A downlink reference signal individually configured for a terminal device is referred to as "UE-specific reference signal (URS)", "demodulation reference signal (DMRS)", or dedicated "RS (DRS)", and is referred to for a channel compensation process for demodulating an enhanced physical downlink control channel or a physical downlink shared channel.

The physical downlink control channel (PDCCH) occupying one or several OFDM symbols (e.g., from 1 to 4 OFDM symbols) from the start of each subframe is transmitted. The enhanced physical downlink control channel (EPDCCH) is a physical downlink control channel allocated to the OFDM symbols to which the physical downlink shared channel (PDSCH) is allocated. The PDCCH or EPDCCH is used for notifying each terminal device of radio resource allocation information according to scheduling determined by the base station device and information indicating an adjustment amount for an increase or decrease in transmit power. In the following, even when the physical downlink control channel (PDCCH) alone is described, both physical channels, that is, the PDCCH and the EPDCCH, are included unless otherwise noted.

The terminal device needs to monitor a physical downlink control channel addressed to the terminal device itself, and receive the physical downlink control channel addressed to the terminal device itself, before transmitting and receiving downlink data or a layer-2 message and layer-3 message, which is higher-layer control information (such as a paging or handover command), and thereby acquire, from the physical downlink control channel, radio resource allocation information called uplink grant in a case of transmission and downlink grant (downlink assignment) in a case of reception. Note that it is also possible to constitute the physical downlink control channel so that the physical downlink control channel is to be transmitted in the dedicated resource block domain allocated to each terminal device by the base station device, instead of transmission through OFDM symbols described above.

The physical uplink control channel (PUCCH) is used for an acknowledgment (hybrid automatic repeat request-acknowledgment; HARQ-ACK or acknowledgment/negative acknowledgment: ACK/NACK) in response to reception of downlink data transmitted on the physical downlink shared channel, downlink channel (channel state) information (CSI), and uplink radio resource allocation request (radio resource request, scheduling request (SR)).

CSI includes a channel quality indicator (CQI), a precoding matrix indicator (PMI), a precoding type indicator (PTI), and a rank indicator (RI), which can be used respectively for specifying (representing) a preferable modulation scheme and coding rate, a preferable precoding matrix, a preferable PMI type, and a preferable rank. Indication may be used as a notation for each indicator. Moreover, the CQI and the PMI are classified into a wideband CQI and PMI assuming transmission using all the resource blocks in a single cell and a subband CQI and PMI assuming transmission using some consecutive resource blocks (subbands) in a single cell. Moreover, PMI may be a type of PMI that represents a single preferable precoding matrix by using two kinds of PMIs, a first PMI and a second PMI, in addition to a normal type of PMI, which represents a single preferable precoding matrix by using a single PMI.

The physical downlink shared channel (PDSCH) is also used to notify the terminal device of broadcast information (system information) that is not notified by paging or on the physical broadcast channel, in addition to downlink data, as a layer-3 message. Radio resource allocation information of the physical downlink shared channel is indicated by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

The physical uplink shared channel (PUSCH) mainly transmits uplink data and uplink control information and may also include uplink control information such as CSI and ACK/NACK. Moreover, the physical uplink shared channel is also used for the terminal device to notify the base station device of a layer-2 message and a layer-3 message, which are higher-layer control information, in addition to uplink data. Radio resource allocation information of the physical uplink shared channel is provided by a physical downlink control channel, as in a case of downlink.

An uplink reference signal (also referred to as "uplink pilot signal" or "uplink pilot channel") includes a demodulation reference signal (DMRS) to be used by the base station device to demodulate the physical uplink control channel PUCCH and/or physical uplink shared channel PUSCH, and a sounding reference signal (SRS) to be mainly used by the base station device to estimate an uplink channel state. Moreover, the sounding reference signals include a periodic sounding reference signal (periodic SRS), which is transmitted periodically, or an aperiodic sounding reference signal (aperiodic SRS), which is transmitted when transmission is instructed by the base station device.

A physical random access channel (PRACH) is used for the notification (configuration) of a preamble sequence and includes a guard time. A preamble sequence is constituted so that the base station device is notified of the information by using a plurality of sequences. For example, when 64 kinds of sequences are prepared, information of 6 bits can be provided to the base station device. A physical random access channel is used by the terminal device as a means for accessing the base station device.

The terminal device uses the physical random access channel to request an uplink radio resource when no physical uplink control channel is configured for an SR or to request the base station device for transmission timing adjustment information (also referred to as "timing advance (TA) command") necessary for matching an uplink transmission timing to a reception timing window of the base station device, for example. Moreover, the base station device can use a physical downlink control channel to request the terminal device to start a random access procedure.

A layer-3 message is exchanged between the RRC (radio resource control) layers of the terminal device and the base station device and handled in a protocol for a control-plane (C-plane), and may be used as a synonym of RRC signaling or RRC message. A protocol handling user data (uplink data and downlink data) is referred to as "user-plane (UP (U-plane))" in contrast to "control plane." Here, a transport block, which is physical-layer transmission data, includes C-plane messages and U-plane data in higher layers. Note that detailed description of other physical channels is omitted.

A communicable range (communication area) of each frequency controlled by a base station device is assumed as a cell. Here, the communication area covered by a base station device may be different in size and shape for each frequency. Moreover, the covered area may be different for each frequency. A radio network in which cells having different types of base station devices and different cell radii coexist in the area of the same frequency and/or different frequencies to form a single communication system, is referred to as "heterogeneous network."

The terminal device operates by assuming the inside of a cell as a communication area. When the terminal device moves from a cell to a different cell, the terminal device moves to an appropriate different cell through a cell reselection procedure at the time of having no radio connection (during no communication) and through a handover procedure at the time of having radio connection (during communication). The appropriate cell is in general a cell that is determined that access by the terminal device is not prohibited on the basis of information specified by the corresponding base station device and that has a downlink reception quality satisfying a prescribed condition.

Moreover, the terminal device and the base station device may employ a technique for aggregating the frequencies (component carriers or frequency band) of a plurality of different frequency bands through carrier-aggregation and treating the resultant as a single frequency (frequency band). The component carrier is categorized as an uplink component carrier corresponding to the uplink and a downlink component carrier corresponding to the downlink. In this specification, "frequency" and "frequency band" may be used as synonyms.

For example, when five component carriers each having a frequency bandwidth of 20 MHz are aggregated through carrier-aggregation, a terminal device capable of carrier-aggregation performs transmission and reception by assuming the frequency bandwidth as 100 MHz. Note that component carriers to be aggregated may have consecutive frequencies or frequencies some or all of which are nonconsecutive frequencies. For example, when usable frequency bands are a band of 800 MHz, a band of 2 GHz, and a band of 3.5 GHz, a component carrier may be transmitted in a band of 800 MHz, a different component carrier may be transmitted in a band of 2 GHz, and a further different component carrier may be transmitted in a band of 3.5 GHz.

It is also possible to aggregate a plurality of consecutive or nonconsecutive component carriers of the same frequency band. The frequency bandwidth of each component carrier may be narrower (e.g., 5 MHz or 10 MHz) than the receivable frequency bandwidth (e.g., 20 MHz) of the terminal device, and the frequency bandwidths of component carriers to be aggregated may be different from each other. Each frequency bandwidth is preferably equal to any of the frequency bandwidths of conventional cells in consideration of backward compatibility but may be a frequency bandwidth different from any of the frequency bandwidths of conventional cells.

Moreover, component carriers (carrier types) without backward compatibility may be aggregated. Note that the number of uplink component carriers to be allocated to (configured for or added for) the terminal device by the base station device is preferably the same as or fewer than the number of downlink component carriers.

A cell constituted by an uplink component carrier in which an uplink control channel is configured for a radio resource request and a downlink component carrier having a cell-specific connection with the uplink component carrier is referred to as "primary cell (PCell)." A cell constituted by component carriers other than the primary cell is referred to as "secondary cell (SCell)." The terminal device receives a paging message, detects update of broadcast information, carries out an initial access procedure, configures security information, and the like in a primary cell, and may not perform these operations in a secondary cell.

Although a primary cell is not a target of activation and deactivation controls (in other words, considered as being activated at any time), a secondary cell has activated and deactivated states, the change of which is explicitly specified by the base station device or is made on the basis of a timer configured for the terminal device for each component carrier. The primary cell and secondary cell are collectively referred to as "serving cell."

Note that carrier-aggregation is communication using a plurality of component carriers (frequency bands) by a plurality of cells and is also referred to as "cell aggregation." The terminal device may have radio connection with the base station device via a relay station device (or repeater) for each frequency. In other words, the base station device of the present embodiment may be replaced with a relay station device.

The base station device manages a cell, which is an area where terminal devices can communicate with the base station device, for each frequency. A single base station device may manage a plurality of cells. Cells are classified into a plurality of kinds depending on the sizes of the areas (cell sizes) in which communication is possible with terminal devices. For example, cells are classified into macro cells and small cells. Moreover, small cells are classified into femto cells, pico cells, and nano cells depending on the sizes of the areas. When a terminal device can communicate with a certain base station device, the cell configured so as to be used for the communication with the terminal device is referred to as "serving cell" while the other cells not used for the communication are referred to as "neighboring cell", among the cells of the base station device.

In other words, in carrier aggregation (also referred to as "carrier-aggregation"), a plurality of serving cells thus configured include one primary cell and one or a plurality of secondary cells.

A primary cell is a serving cell in which an initial connection establishment procedure has been carried out, a serving cell in which a connection re-establishment procedure has been started, or a cell indicated as a primary cell during a handover procedure. The primary cell operates at a primary frequency. At the point in time when a connection is (re)established, or later, a secondary cell may be configured. Each secondary cell operates at a secondary frequency. The connection may be referred to as "RRC connection." For the terminal device supporting CA, a single primary cell and one or more secondary cells are aggregated.

In the present embodiment, licensed assisted access (LAA) is used. In the LAA, an allocated frequency is configured (used) for a primary cell, and an unallocated frequency is configured for at least one of the secondary cells. A secondary cell for which an unallocated frequency is configured is assisted by a primary cell or a secondary cell for which an allocated frequency is configured. For example, a primary cell or a secondary cell for which an allocated frequency is configured notifies a secondary cell for which an unallocated frequency is configured, of configuration and/or control information, by RRC signaling, MAC signaling, and/or PDCCH signaling. In the present embodiment, a cell assisted by a primary cell or a secondary cell is also referred to as "LAA cell." The LAA cell can be aggregated with (assisted by) a primary cell and/or a secondary cell by carrier aggregation. A primary cell or a secondary cell assisting the LAA cell is also referred to as "assist cell."

The LAA cell can be aggregated with (assisted by) a primary cell and/or a secondary cell by dual connectivity.

Hereinafter, a basic construction (architecture) of dual connectivity will be described. For example, a case where a terminal device 1 simultaneously connects with a plurality of base station devices 2 (for example, a base station device 2-1, and a base station device 2-2) will be described. It is assumed that the base station device 2-1 constitutes a macro cell, and the base station device 2-2 constitutes a small cell. The terminal device 1 connecting to the base station devices 2 at the same time by using the plurality of cells belonging to the plurality of base station devices 2 as described above is referred to as "dual connectivity." The cells belonging to each of the base station devices 2 may be operated at the same frequency or different frequencies.

Note that carrier-aggregation is different from dual connectivity in that a single base station device 2 manages a plurality of cells and the frequencies of the respective cells are different from each other. In other words, carrier-aggregation is a technique for connecting a single terminal device 1 and a single base station device 2 via a plurality of cells having different frequencies, while dual connectivity is a technique for connecting a single terminal device 1 and the plurality of base station devices 2 via a plurality of cells having the same frequency or different frequencies.

The terminal device 1 and the base station device 2 can apply a technique applied to carrier-aggregation, to dual connectivity. For example, the terminal device 1 and the base station device 2 may apply a technique such as assignment of a primary cell and a secondary cell or activation/deactivation, to cells connected through dual connectivity.

In the dual connectivity, the base station device 2-1 or base station device 2-2 is connected to an MME and an SGW via a backbone network. The MME is a host control station device corresponding to a mobility management entity (MME) and has the functions of managing mobility and performing authentication control (security control) for the terminal device 1, and configuring a path for user data to the base station devices 2. The SGW is a host control station device corresponding to a serving gateway (S-GW) and has the function of transmitting user data according to a path for user data to the terminal device 1 configured by the MME.

Moreover, in the dual connectivity, a connection path between the base station device 2-1 or the base station device 2-2 and the SGW is referred to as "SGW interface." Moreover, a connection path between the base station device 2-1 or the base station device 2-2 and the MME is referred to as "MME interface." Moreover, a connection path between the base station device 2-1 and the base station device 2-2 is referred to as "base station interface." The SGW interface is also referred to as "S1-U interface" in EUTRA. Moreover, the MME interface is also referred to as "S1-MME interface" in EUTRA. Moreover, the base station interface is also referred to as "X2 interface" in EUTRA.

An example of architecture for enabling dual connectivity will be described. In dual connectivity, the base station device 2-1 and the MME are connected via the MME interface. Moreover, the base station device 2-1 and the SGW are connected via the SGW interface. Moreover, the base station device 2-1 provides, to the base station device 2-2, the communication path to the MME and/or SGW via the base station interface. In other words, the base station device 2-2 is connected to the MME and/or the SGW via the base station device 2-1.

Moreover, another example of another architecture for enabling dual connectivity will be described. In dual connectivity, the base station device 2-1 and the MME are connected via the MME interface. Moreover, the base station device 2-1 and the SGW are connected via the SGW interface. The base station device 2-1 provides, to the base station device 2-2, the communication path to the MME via the base station interface. In other words, the base station device 2-2 is connected to the MME via the base station device 2-1. Moreover, the base station device 2-2 is connected to the SGW via the SGW interface.

Note that a constitution in which the base station device 2-2 and the MME are directly connected via the MME interface may be employed.

On the basis of description from a different point of view, dual connectivity is an operation whereby a prescribed terminal device consumes radio resources provided from at least two different network points (master base station device (MeNB or Master eNB) and secondary base station device (SeNB or Secondary eNB)). In other words, in dual connectivity, a terminal device is configured to establish an RRC connection to at least two network points. In dual connectivity, the terminal device may be connected via a non-ideal backhaul in RRC connected (RRC_CONNECTED) state.

In dual connectivity, a base station device that is connected to at least the S1-MME and that acts as a mobility anchor of the core network is referred to as "master base station device." Moreover, a base station device that is not the master base station device and that provides supplemental radio resources to a terminal device is referred to as "secondary base station device." A group of serving cells that is associated with the master base station device may be referred to as "master cell group (MCG)" and a group of serving cells that is associated with the secondary base station device may be referred to as "secondary cell group (SCG)." Note that the cell group may be a serving cell group.

In dual connectivity, a primary cell belongs to the MCG. Moreover, in the SCG, a secondary cell that corresponds to a primary cell is referred to as "primary secondary cell (pSCell)." Note that the pSCell may be referred to as "special cell" or "special secondary cell (special SCell)." Some of the functions (for example, functions for transmitting and receiving a PUCCH) of the PCell (the base station device constituting the PCell) may be supported in the special SCell (the base station device constituting the special SCell). Additionally, some of the functions of the PCell may be only supported in the pSCell. For example, the function for transmitting a PDCCH may be only supported in the pSCell. Additionally, the function for performing a PDCCH transmission may be supported in a pSCell using a search space different from a CSS or USS. For example, a search space different from a USS is a search space determined on the basis of a value defined in the specification, a search space determined on the basis of an RNTI different from a C-RNTI, a search space determined on the basis of a value configured by a higher layer that is different from an RNTI, or the like. Moreover, the pSCell may constantly be in an activated state. Moreover, the pSCell is a cell capable of receiving a PUCCH.

In dual connectivity, a data radio bearer (DRB) may be individually allocated to the MeNB and the SeNB. On the other hand, a signaling radio bearer (SRB) may be allocated only to the MeNB. In dual connectivity, a duplex mode may be configured individually for the MCG and the SCG or the PCell and the pSCell. In dual connectivity, the MCG and the SCG or the PCell and the pSCell need not necessarily be synchronized with each other. In dual connectivity, a plurality of parameters for timing adjustment (TAG or Timing Advance Group) may be configured for each of the MCG and the SCG. In other words, the terminal device is capable of performing uplink transmission at a plurality of different timings in each CG.

In dual connectivity, the terminal device is allowed to transmit UCI corresponding to the cells in the MCG only to the MeNB (the PCell) and to transmit UCI corresponding to the cells in the SCG only to SeNB (the pSCell). For example, the UCI is an SR, HARQ-ACK, and/or CSI. Additionally, in each UCI transmission, a transmission method using the PUCCH and/or the PUSCH is applied to each cell group.

All signals can be transmitted and received in the primary cell, but some signals may not be transmitted and received in the secondary cell. For example, a physical uplink control channel (PUCCH) is transmitted only in the primary cell. Additionally, unless a plurality of timing advance groups (TAGs) are configured between the cells, a physical random access channel (PRACH) is transmitted only in the primary cell. Additionally, a physical broadcast channel (PBCH) is transmitted only in the primary cell. Additionally, a master information block (MIB) is transmitted only in the primary cell. Signals that can be transmitted and received in the primary cell are transmitted and received in the primary secondary cell. For example, the PUCCH may be transmitted in the primary secondary cell. Additionally, the PRACH may be transmitted in the primary secondary cell, regardless of whether a plurality of TAGs are configured. Additionally, the PBCH and the MIB may be transmitted in the primary secondary cell.

In the primary cell, a radio link failure (RLF) is detected. In the secondary cell, even if conditions for the detection of an RLF are in place, the detection of the RLF is not recognized. However, in the primary secondary cell, the RLF is detected if the conditions are in place. When an RLF is detected in the primary secondary cell, the higher layer of the primary secondary cell notifies the higher layer of the primary cell of the detection of the RLF. Semi-persistent scheduling (SPS) or discontinuous reception (DRX) may be used in the primary cell. The same DRX as in the primary cell may be used in the secondary cell. Fundamentally, in the secondary cell, the MAC configuration information/parameters are shared with the primary cell/primary secondary cell of the same cell group. Some of the parameters (for example, sTAG-Id) may be configured for each secondary cell. Some of the timers or counters may be applied only to the primary cell and/or the primary secondary cell. A timer or counter to be applied may be configured only to the secondary cell.

In one example of cases where the dual connectivity is applied to an LAA cell, the MCG (base station device 2-1) is a base station device constituting a primary cell, and the SCG (base station device 2-2) is a base station device constituting the LAA cell. That is, the LAA cell is configured as a pSCell of the SCG.

In another example of cases where the dual connectivity is applied to an LAA cell, the MCG is a base station device constituting a primary cell, and the SCG is a base station device constituting a pSCell and the LAA cell. That is, the LAA cell is assisted by the pSCell in the SCG. Noted that, if a secondary cell is further configured for the SCG, the LAA cell may be assisted by the secondary cell.

In another example of cases where the dual connectivity is applied to an LAA cell, the MCG is a base station device constituting a primary cell and the LAA cell, and the SCG is a base station device constituting a pSCell. That is, the LAA cell is assisted by the primary cell in the MCG. Note that, if a secondary cell is further configured for the MCG, the LAA cell may be assisted by the secondary cell.

Figure 3:
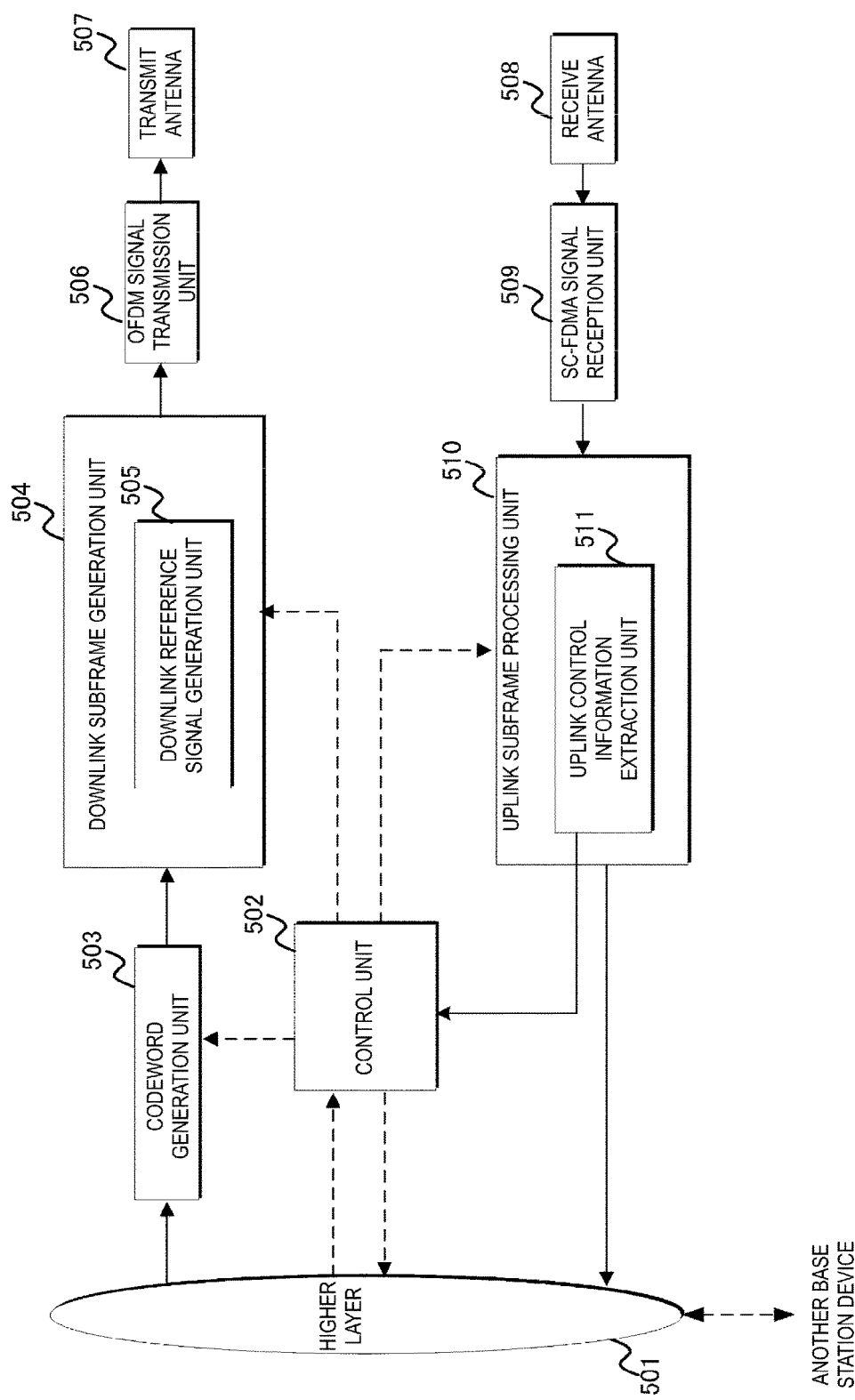
FIG. 3 is a schematic diagram illustrating an example of a block configuration of a base station device 2 according to the present embodiment.

FIG. 3 is a schematic diagram illustrating an example of a block configuration for a base station device 2 according to the present embodiment. The base station device 2 includes a higher layer (higher-layer control information notification unit, higher layer processing unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit) 511.

Figure 4:
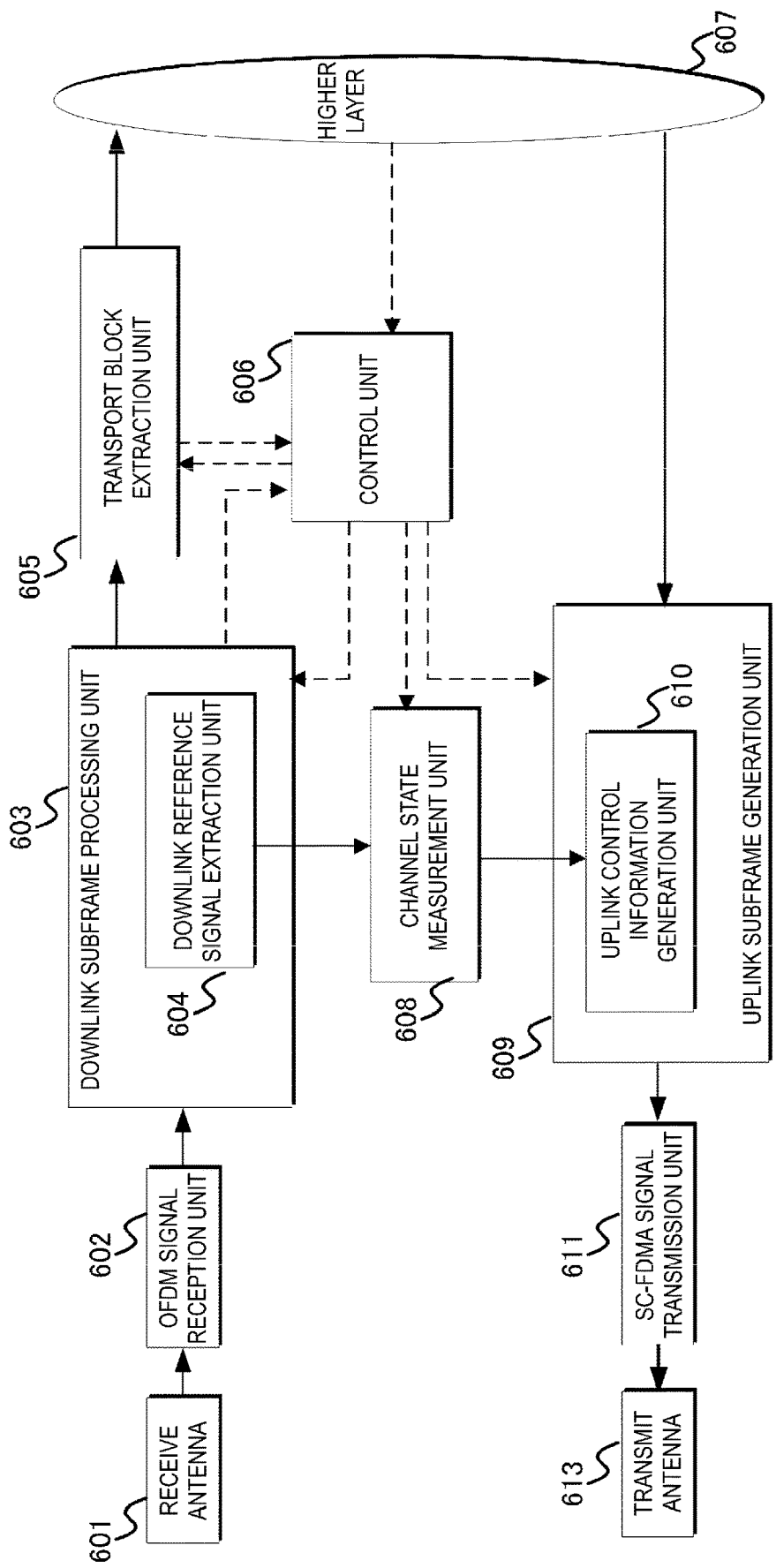
FIG. 4 is a schematic diagram illustrating an example of a block configuration of a terminal device 1 according to the present embodiment.

FIG. 4 is a schematic diagram illustrating an example of a block configuration of the terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit, higher layer processing unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610.

First, a flow of downlink data transmission and reception will be described by using FIG. 3 and FIG. 4. In the base station device 2, the control unit 502 holds a modulation and coding scheme (MCS) indicating the modulation scheme and coding rate and the like in the downlink, downlink resource allocation indicating RBs to be used for data transmission, and information to be used for HARQ control (a redundancy version, the HARQ process number, and a new data indicator) and controls the codeword generation unit 503 and downlink subframe generation unit 504 on the basis of these. Downlink data (also referred to as "downlink transport block") transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. In the downlink subframe generation unit 504, downlink subframes are generated by an instruction from the control unit 502. First, a codeword generated in the codeword generation unit 503 is converted into a modulation symbol sequence through a modulation process, such as phase shift keying (PSK) modulation or quadrature amplitude modulation (QAM). Moreover, a modulation symbol sequence is mapped to REs of some RBs, and a downlink subframe for each antenna port is generated through a precoding process. In this operation, the transmission data sequence transmitted from the higher layer 501 includes higher-layer control information, which is control information of the higher layer (e.g., dedicated (individual) radio resource control (RRC) signaling). Moreover, in the downlink reference signal generation unit 505, a downlink reference signal is generated. The downlink subframe generation unit 504 maps the downlink reference signal to the REs in the downlink subframes by an instruction from the control unit 502. The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including a plurality of OFDM signal transmission units 506 and transmit antennas 507 may be employed when downlink subframes are transmitted on a plurality of antenna ports. Moreover, the downlink subframe generation unit 504 may also have the capability of generating physical-layer downlink control channels, such as a PDCCH and an EPDCCH to map the channels to REs in downlink subframes. Multiple base station devices (base station device 2-1 and base station device 2-2) transmit separate downlink subframes.

In the terminal device 1, an OFDM signal is received by the OFDM signal reception unit 602 via the receive antenna 601, and an OFDM demodulation process is performed on the signal. The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in an area to which the PDCCH and EPDCCH can be allocated, and checks cyclic redundancy check (CRC) bits added in advance (blind decoding). In other words, the downlink subframe processing unit 603 monitors the PDCCH and the EPDCCH. When the CRC bits match the ID (a single terminal-specific identifier assigned to the single terminal, such as a cell-radio network temporary identifier (C-RNTI) or a semi persistent scheduling-C-RNTI (SPS-C-RNTI), or a temporary C-RNTI assigned by the base station device in advance), the downlink subframe processing unit 603 recognizes that the PDCCH or the EPDCCH has been detected and extracts the PDSCH by using control information included in the detected PDCCH or EPDCCH. The control unit 606 holds MCS indicating the modulation scheme, coding rate, and the like in the downlink based on the control information, downlink resource allocation indicating RBs to be used for downlink data transmission, and information to be used for HARQ control, and controls the downlink subframe processing unit 603, the transport block extraction unit 605, and the like on the basis of these. More specifically, the control unit 606 performs control so as to carry out an RE mapping process in the downlink subframe generation unit 504, an RE demapping process and demodulation process corresponding to the modulation process, and the like. The PDSCH extracted from the received downlink subframe is transmitted to the transport block extraction unit 605. The downlink reference signal extraction unit 604 in the downlink subframe processing unit 603 extracts the downlink reference signal from the downlink subframe. In the transport block extraction unit 605, a rate matching process, a rate matching process corresponding to error correction decoding, error correction decoding and the like in the codeword generation unit 503 are carried out, and a transport block is extracted and transmitted to the higher layer 607. The transport block includes higher-layer control information, and the higher layer 607 notifies the control unit 606 of a necessary physical-layer parameter on the basis of the higher-layer control information. The plurality of base station devices 2 (base station device 2-1 and base station device 2-2) each transmit individual downlink subframes, and the terminal device 1 receives the downlink subframes. Hence, the above-described processes may be carried out for the downlink subframe of each of the plurality of base station devices 2. In this case, the terminal device 1 may recognize that a plurality of downlink subframes have been transmitted from the plurality of base station devices 2, or need not recognize this. If the terminal device 1 does not recognize the above, the terminal device 1 may simply recognize that a plurality of downlink subframes have been transmitted from a plurality of cells. Moreover, the transport block extraction unit 605 determines whether the transport block has been detected correctly and transmits the determination result to the control unit 606.

Next, a flow of uplink signal transmission and reception will be described. In the terminal device 1, a downlink reference signal extracted by the downlink reference signal extraction unit 604 is transferred to the channel state measurement unit 608 by an instruction from the control unit 606, the channel state and/or interference is measured in the channel state measurement unit 608, and further CSI is calculated on the basis of the measured channel state and/or interference. The control unit 606 instructs the uplink control information generation unit 610 to generate HARQ-ACK (DTX (not transmitted yet), ACK (detection succeeded), or NACK (detection failed)) and to map the HARQ-ACK to a downlink subframe on the basis of the determination result whether the transport block is correctly detected. The terminal device 1 performs these processes on the downlink subframe of each of a plurality of cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to RBs in an uplink subframe, and the uplink subframe is generated. The uplink subframe is subjected to the SC-FDMA modulation to generate an SC-FDMA signal, and the SC-FDMA signal is transmitted via the transmit antenna 613 by the SC-FDMA signal transmission unit 611.

Hereinafter, details of the LAA cell will be described.

A frequency used by the LAA cell is shared with other communication systems and/or other LTE operators. In frequency sharing, the LAA cell is required to be impartial to other communication systems and/or other LTE operators. For example, in a communication scheme used in the LAA cell, an impartial frequency sharing technique (method) is required. In other words, the LAA cell is a cell configured to perform a communication scheme (communication procedure) to which an impartial frequency sharing technique can be applied (used).

An example of the impartial frequency sharing technique is listen-before-talk (LBT). Before a certain base station or a terminal transmits a signal using a certain frequency (component carrier, cell), the LBT identifies (detects, assumes, determines) whether the frequency is in an idle state (available state, congestion state, presence, or occupied) or a busy state (unavailable state, non-congestion state, absence, or clear), by measuring (detecting) interference power (an interference signal, receive power, received signal, noise power, noise signal) and the like, of the frequency. When the frequency is identified to be in the idle state on the basis of the LBT, the LAA cell can transmit a signal at a predetermined timing at the frequency. When the frequency is identified to be in the busy state on the basis of the LBT, the LAA cell does not transmit a signal at a predetermined timing at the frequency. The LBT can perform control so as not to interfere with signals transmitted by other base stations and/or terminals including other communication systems and/or other LTE operators.

A procedure of the LBT is defined as a mechanism by which a certain base station or a terminal applies a CCA check before using the frequency (channel). To identify whether or not the frequency is in the idle state or the busy state, the CCA detects power or a signal for determining presence or absence of another signal, in the channel. Note that, in the present embodiment, a definition of the CCA may be equivalent to the definition of the LBT.

In the CCA, various methods can be used for determining presence or absence of another signal. For example, the determination in the CCA is based on whether or not the interference power at a certain frequency exceeds a certain threshold value. Moreover, for example, the determination in the CCA is based on whether or not the receive power of a predetermined signal or channel at a certain frequency exceeds a certain threshold value. The threshold value may be predefined. The threshold value may be configured from the base station or another terminal. The threshold value may be determined (configured) at least on the basis of another value (a parameter) such as transmit power (maximum transmit power).

Note that, the CCA in the LAA cell need not be recognized by the terminal connected to (configured in) the LAA cell.

The LAA cell may be defined as a cell that is different from the secondary cell using an allocated frequency. For example, the LAA cell is configured to be different from the configuration of the secondary cell using an allocated frequency. Some of the parameters configured for the LAA cell are not configured for the secondary cell using an allocated frequency. Some of the parameters configured for the secondary cell using an allocated frequency are not configured for the LAA cell. In the present embodiment, although the LAA cell will be described as a cell that is different from the primary cell or the secondary cell, the LAA cell may be defined as one of the secondary cells. Further, a conventional secondary cell may also be referred to as "first secondary cell", and the LAA cell may also be referred to as "second secondary cell." Moreover, a conventional primary cell and secondary cell are also referred to as "first serving cell", and the LAA cell may also be referred to as "second serving cell."

Furthermore, the LAA cell may use a frame structure type different from a conventional one. For example, the conventional serving cell uses (configures) a frame structure type 1 (FDD) or a frame structure type 2 (TDD); however, the LAA cell uses (configures) a frame structure type 3.

Here, an unallocated frequency is different from an allocated frequency allocated as an exclusive frequency to a predetermined operator. For example, the unallocated frequency is used by wireless LAN. Moreover, the unallocated frequency is not configured in the conventional LTE, and the allocated frequency can be configured in the conventional LTE, for example. In the present embodiment, the frequency configured for the LAA cell will be described as the unallocated frequency; however, it is not limited thereto. That is, the unallocated frequency can be replaced with the frequency configured for the LAA cell. For example, the unallocated frequency cannot be configured for the primary cell, and can be configured only for the secondary cell. For example, the unallocated frequency also includes frequencies shared with a plurality of operators. Moreover, the unallocated frequency is configured only for cells to be configured, assumed, and/or processed differently from the conventional primary cell or the secondary cell, for example.

The LAA cell can be configured to use a scheme different from the conventional scheme, with respect to the constitution of a radio frame, a physical signal, and/or a physical channel and the communication procedures in LTE.

For example, a predetermined signal and/or channel configured in (transmitted from) the primary cell and/or the secondary cell is not configured in (transmitted form) the LAA cell. The predetermined signal and/or channel includes CRS, DS, PDCCH, EPDCCH, PDSCH, PSS, SSS, PBCH, PHICH, PCFICH, CSI-RS, and/or SIB. For example, a signal and/or channel not configured in the LAA cell is as follows. Note that a signal and/or channel described below may be used in combination. Note that, in the present embodiment, a signal and/or channel not configured in the LAA cell may be replaced with a signal and/or channel for which the terminal does not expect transmission from the LAA cell.

(1) In the LAA cell, control information of the physical layer is not transmitted on the PDCCH, but only on the EPDCCH.

(2) In the LAA cell, a CRS, DMRS, URS, PDCCH, EPDCCH and/or PDSCH is not transmitted in all subframes even in a subframe that is activated (ON), and the terminal does not assume that the signal is being transmitted in all subframes.

(3) In the LAA cell, the terminal assumes that a DRS, PSS, and/or SSS is being transmitted in a subframe that is activated (ON).

(4) In the LAA cell, the terminal is notified of information on CRS mapping for each subframe, and assumes the CRS mapping on the basis of the information. For example, the assumption of the CRS mapping is that a CRS is not mapped to all resource elements of the subframe. The assumption of the CRS mapping is that a CRS is not mapped to some resource elements of the subframe (for example, all resource elements in the first two OFDM symbols). The assumption of CRS mapping is that a CRS is mapped to all resource elements of the subframe. Moreover, information on the CRS mapping is notified from the LAA cell or a cell different form the LAA cell, for example. The information on the CRS mapping is included in the DCI, and notified by the PDCCH or EPDCCH.

Further, a predetermined signal and/or channel not configured in (transmitted from) the primary cell and/or the secondary cell is not configured in (transmitted form) the LAA cell, for example.

In addition, in the LAA cell, only downlink component carriers or subframes are defined, and only downlink signals and/or channels are transmitted, for example. That is, in the LAA cell, uplink component carriers or subframes are not defined, and uplink signals and/or channels are not transmitted.

Moreover, in the LAA cell, a compatible downlink control information (DCI) format is different from a DCI format compatible to the primary cell and/or the secondary cell, for example. The DCI format compatible only to the LAA cell is defined. The DCI format compatible to the LAA cell includes control information that has efficacy only in the LAA cell.

Moreover, in the LAA cell, the assumption of a signal and/or channel is different from that in a conventional secondary cell, for example.

First, the assumption of a signal and/or channel in a conventional secondary cell will be described. A terminal that satisfies some of or all the following conditions assumes that a PSS, SSS, PBCH, CRS, PCFICH, PDSCH, PDCCH, EPDCCH, PHICH, DMRS, and/or CSI-RS may not be transmitted by the secondary cell, except to transmit a DS. Moreover, the terminal assumes that the DS is always transmitted by the secondary cell. Further, the assumption continues to the subframe in which an activation command (command to activate) is received in the secondary cell at a carrier frequency at which the terminal exists.

(1) The terminal supports the configuration (parameter) related to the DS.

(2) The terminal is configured to perform RRM measurement based on the DS, in the secondary cell.

(3) The secondary cell is deactivated (in a deactivated state).

(4) The terminal is not configured to receive MBMS in the higher layer, in the secondary cell.

Moreover, when the secondary cell is activated (in an activated state), the terminal assumes that the PSS, SSS, PBCH, CRS, PCFICH, PDSCH, PDCCH, EPDCCH, PHICH, DMRS, and/or CSI-RS is transmitted by the secondary cell, in the configured predetermined subframe or all subframes.

Next, an example of an assumption of a signal and/or channel in the LAA cell will be described. A terminal that satisfies some of or all the following conditions assumes that the PSS, SSS, PBCH, CRS, PCFICH, PDSCH, PDCCH, EPDCCH, PHICH, DMRS, and/or CSI-RS may not be transmitted by the LAA cell, including no transmission of a DS. Further, the assumption continues to the subframe in which an activation command (command to activate) is received in the secondary cell at a carrier frequency at which the terminal exists.

(1) The terminal supports the configuration (parameter) related to the DS.

(2) In the LAA cell, RRM measurement based on the DS is configured for the terminal device.

(3) The LAA cell is deactivated (in a deactivated state).

(4) The terminal is not configured to receive MBMS in the higher layer, in the LAA cell.

Moreover, another example of the assumption of a signal and/or channel in the LAA cell will be described. When the LAA cell is deactivated (in a deactivated state), assumption of a signal and/or channel in the LAA cell is the same as the assumption of a signal and/or channel in the conventional secondary cell. When the LAA cell is activated (in an activated state), the assumption of a signal and/or channel in the LAA cell is different from the assumption of a signal and/or channel in the conventional secondary cell. For example, when the LAA cell is activated (in an activated state), the terminal assumes that in the LAA cell, the PSS, SSS, PBCH, CRS, PCFICH, PDSCH, PDCCH, EPDCCH, PHICH, DMRS, and/or CSI-RS may not be transmitted, except for transmission in a predetermined subframe configured for the LAA cell. Details of this will be described later.

Next, a communication procedure in the LAA cell will be described in detail.

Figure 5:
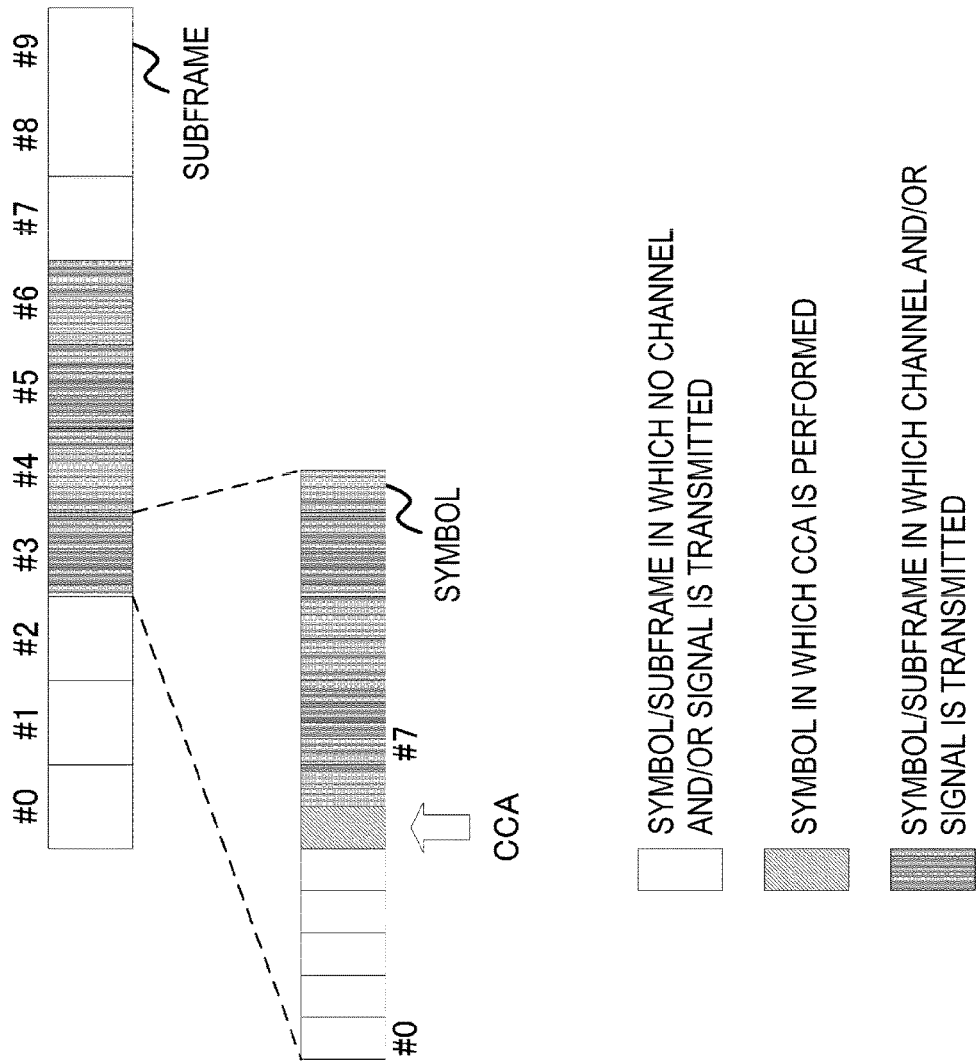
FIG. 5 is a diagram illustrating an example of a communication procedure in an LAA cell according to the present embodiment.

FIG. 5 is a diagram illustrating an example of a communication procedure in an LAA cell. FIG. 5 illustrates 10 subframes indicated with subframes from #0 to #9, and 14 symbols (OFDM symbols) of symbols from #0 to #13 in the subframe #3. Moreover, in this example, the LAA cell can transmit a signal of a maximum of 4 ms (corresponding to four subframes), and the CCA is performed in the symbol #5 in the subframe #3. Further, a case is assumed where the LAA cell determines that the frequency is in an idle state in the CCA, and can start transmitting a signal in a symbol next to the current symbol. In FIG. 5, the LAA cell transmits a signal from the symbol #6 in the subframe #3 to a predetermined symbol in the subframe #6.

FIG. 5 is a view illustrating that in a symbol or subframe indicated by "symbol/subframe in which a channel and/or signal is not transmitted (cannot be transmitted)", the LAA transmits nothing. Moreover, in FIG. 5, in a symbol or a subframe indicated by "symbol/subframe in which a channel and/or signal is transmitted (can be transmitted)", the LAA transmits at least the PDSCH and a terminal-specific reference signal associated with the PDSCH. Further, the PDSCH is mapped (scheduled) to each terminal with a resource block pair as a unit. Information on the mapping (scheduling) is notified through the PDCCH or the EPDCCH transmitted in each subframe. Information on mapping for the PDSCH in a certain subframe may be notified in the same subframe, or may be notified in another subframe.

In FIG. 5, when the LAA cell transmits the PDSCH by using symbols from #6 to #13 in the subframe #3, the terminal that receives the PDSCH needs to recognize that the PDSCH is mapped to symbols from #6 to #13 in the subframe #3.

An example of the recognition method uses, in a predetermined subframe (subframe #3, for example) of the LAA cell, information for recognizing a symbol in which a channel and/or signal is transmitted. For example, the information is any of the following, or a combination thereof.

(1) The information is information indicating, in the predetermined subframe, a start symbol of a symbol in which a channel and/or signal is transmitted. The information indicating a start symbol is any one of 0 to 13, and each value indicates a symbol number to be a start symbol.

(2) The information is information indicating, in the predetermined subframe, a start symbol of a symbol in which a channel and/or signal is transmitted. The information indicating a start symbol is index information in which a value predefined from a value of 0 to 13 is indexed.

(3) The information is bitmap information indicating, in the predetermined subframe, a symbol in which a channel and/or signal is transmitted. The bitmap information is composed of 14 bits. The bitmap information indicates a symbol in which a channel and/or signal is transmitted when each bit is in one state (1, for example), and a symbol in which no channel and/or signal is transmitted when each bit is in the other state (0, for example).

(4) The information is information indicating, in the predetermined subframe, the last symbol of a symbol in which no channel and/or signal is transmitted, or indicating the number of symbols in which no channel and/or signal is transmitted. For example, the last symbol is any one of 0 to 13, and each value indicates a symbol number to be the last symbol. For example, the information indicating the number of symbols is any one of 1 to 14, and each value indicates the number of symbols.

(5) The information is information indicating, in the predetermined subframe, the last symbol of a symbol in which no channel and/or signal is transmitted, or indicating the number of symbols in which no channel and/or signal is transmitted. For example, the last symbol is index information in which a value predefined from a value of 0 to 13 is indexed. For example, the information indicating the number of symbols is index information in which a value predefined from a value of 1 to 14 is indexed.

Furthermore, a method for notifying information for recognizing a symbol in which a channel and/or signal is transmitted uses the following methods, for example.

(1) The information is notified, through RRC signaling or MAC signaling, by a parameter configured (notified) for the LAA cell. When a certain serving cell is the LAA cell, in a certain subframe, no channel and/or signal is transmitted in the configured symbol, and a channel and/or signal is transmitted in other symbols. For example, a symbol in which no channel and/or signal is transmitted is configured to be symbols #0 and #1 in the certain subframe. A symbol in which no channel and/or signal is transmitted is configured to be symbols from #2 to #13 in a certain subframe. Furthermore, this configuration may be different (independent) depending on a channel and/or signal. For example, in a certain subframe, the terminal is configured such that the EPDCCH is mapped to the symbols from #2 to 13, and such that the PDSCH is mapped to the symbols from #1 to #13. Furthermore, the range (possible value) of the start symbol of the PDSCH configured for the LAA cell can be different from the range (from 1 to 4) of the start symbol of the PDSCH configured for the conventional secondary cell. The range of the start symbol of the PDSCH and/or the EPDCCH configured for the LAA cell is from 0 to 13.

(2) The information is notified by the PDCCH or the EPDCCH transmitted from the LAA cell or a serving cell (assist cell, primary cell, or secondary cell) which is different from the LAA cell. The DCI carried (transmitted) by the PDCCH or the EPDCCH includes the information.

(3) The information is notified by a channel or a signal for notifying the information. The channel or the signal for notifying the information is transmitted only to the LAA cell. The channel or the signal for notifying the information is transmitted from the LAA cell, or a serving cell (assist cell, primary cell, or secondary cell) which is different from the LAA cell.

(4) A candidate for the information is configured for (notified to) the LAA cell, through RRC signaling or MAC signaling. The information is selected from the candidate for the information on the basis of the information included in the DCI carried (transmitted) by the PDCCH or the EPDCCH. For example, through the RRC signaling or the MAC signaling, the information indicating four start symbols is configured, and 2-bit information indicating one of the symbols is notified by PDCCH signaling or EPDCCH signaling.

(5) The information is notified by a channel or a signal mapped to predetermined resource elements in a certain subframe. For example, the predetermined resource elements are a plurality of resource elements in a predetermined symbol. For example, the predetermined symbol is the last symbol in the subframe. A subframe to which a channel or a signal for notifying the information is mapped may be all subframes in the LAA cell, or may be a subframe configured by a predefined subframe or the RRC signaling.

(6) The information is predefined. When a certain serving cell is the LAA cell, in a certain subframe, a channel and/or signal is not transmitted in a predetermined symbol, and a channel and/or signal is transmitted in other symbols. For example, a symbol in which no channel and/or signal is transmitted is the symbols #0 and 1 in the certain subframe. The symbol in which no channel and/or signal is transmitted is the symbols from #2 to #13 in the certain subframe. Furthermore, this definition may be different (independent) depending on a channel and/or signal. For example, in the certain subframe, the terminal assumes that the EPDCCH is mapped to the symbols from #2 to #13, and the PDSCH is mapped to the symbols from #1 to #13.

In another example of the recognition method, in a predetermined subframe (subframe #3, for example) of the LAA cell, the terminal detects a symbol in which a channel and/or signal is transmitted. Furthermore, assist information for performing the detection may be configured in the terminal. For example, the detection method uses the following methods.

(1) The detection is performed on the basis of a predetermined signal mapped to the predetermined subframe. The terminal detects, in the predetermined subframe, a symbol in which a channel and/or signal is transmitted, on the basis of whether or not a predefined signal or a configured signal is transmitted. The terminal recognizes, when the predefined signal or the configured signal is detected in a certain symbol of the predetermined subframe, a symbol after the certain symbol as a symbol in which a channel and/or signal is transmitted, in the predetermined subframe. For example, the predefined signal or the configured signal is a CRS, DMRS, and/or URS.

(2) The detection is performed on the basis of a predetermined channel to be mapped to the predetermined subframe. The terminal detects, in the predetermined subframe, a symbol in which a channel and/or signal is transmitted, on the basis of whether or not the predefined channel or the configured channel is detected. The terminal recognizes, when the predefined channel or the configured channel is detected in a certain symbol of the predetermined subframe, a symbol after the certain symbol as a symbol in which a channel and/or signal is transmitted, in the predetermined subframe. For example, the predefined channel or the configured channel is the EPDCCH. Specifically, the terminal performs, in the predetermined subframe, monitoring (detection process, blind detection) of the EPDCCH, on assumption that the EPDCCH is mapped to a symbol after a certain symbol. Here, the terminal may blindly detect a start symbol to which the EPDCCH is assumed to be mapped. Furthermore, a start symbol or a candidate for the start symbol to which the EPDCCH is assumed to be mapped may be predefined, or may be configured.

Furthermore, in the subframe #3 in FIG. 5, a method for mapping the PDCCH, EPDCCH, and/or PDSCH to a resource element may be different from a mapping method in other subframes. For example, the mapping method can use the following methods. Furthermore, the following mapping method (mapping sequence) can also be applied to other signals, such as a reference signal or a synchronization signal.

(1) In the mapping method, the PDCCH, EPDCCH and/or PDSCH is mapped from the last symbol in the subframe. That is, the mapping of the PDCCH, EPDCCH and/or PDSCH to a resource element (k, l) is an allocated physical resource block, and in a resource element to which the channel can be mapped, starts from the OFDM symbol having the maximum OFDM symbol number l (that is, the last symbol in a slot). Furthermore, the mapping is performed in order from the last slot (second slot) of the subframe. Furthermore, in each OFDM symbol, the mapping of the channels starts from the subcarrier having the smallest subcarrier number k.

(2) In the mapping method, the PDCCH, EPDCCH and/or PDSCH is configured to skip a symbol in which no channel and/or signal is transmitted, and mapped to a resource element in a symbol in which a channel and/or signal is transmitted. That is, in mapping the PDCCH, EPDCCH and/or PDSCH, the resource element of the symbol in which no channel and/or signal is transmitted is subject to rate matching.

(3) In the mapping method, the PDCCH, EPDCCH and/or PDSCH is configured not to skip a symbol in which no channel and/or signal is transmitted, and mapped to a resource element in a symbol in which a channel and/or signal is transmitted. In other words, the PDCCH, EPDCCH and/or PDSCH applies mapping without distinguishing between a symbol in which a channel and/or signal is transmitted and a symbol in which no channel and/or signal is transmitted; however, the channel mapped to the symbol in which no channel and/or signal is transmitted is not transmitted, and the channel mapped to the symbol in which a channel and/or signal is transmitted is transmitted. That is, in mapping the PDCCH, EPDCCH and/or PDSCH, puncturing is performed on the resource element of the symbol in which no channel and/or signal is transmitted.

Figure 6:
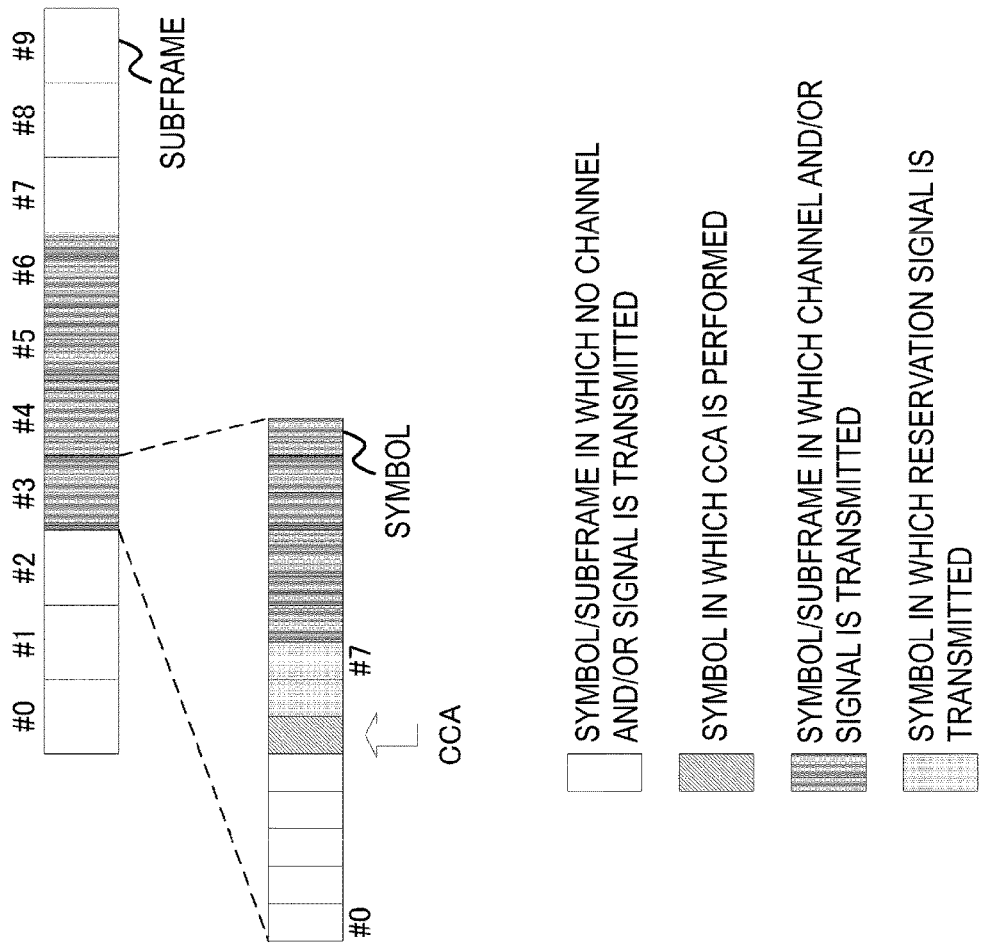
FIG. 6 is a diagram illustrating an example of a communication procedure in an LAA cell according to the present embodiment.

FIG. 6 is a diagram illustrating an example of a communication procedure in a certain LAA cell. The difference from the description in FIG. 5 will be described below. In this example, CCA is performed on the symbol #5 in the subframe #3. Further, a case is assumed where the LAA cell determines that the frequency is in an idle state in the CCA, and can start transmitting a signal in a symbol next to the current symbol. The LAA cell starts transmission of a signal in the symbol #5 in the subframe #3 and ends the transmission in a predetermined symbol in the subframe #6.

In an example of FIG. 6, the symbols #6 and 7 in the subframe #3 are the symbols in which a reservation signal is transmitted. The transmission of the reservation signal is started in a symbol next to the symbol in which the CCA is performed (that is, the symbol #5) and is ended in a symbol before the symbol in which a channel and/or signal is transmitted (that is, the symbol #6). The effect of this reservation signal is as follows. As described in FIG. 5, even in the case where the candidates for a symbol in which a channel and/or signal is transmitted are predefined or configured, the LAA cell can flexibly perform the CCA without depending on the number of candidates.

The reservation signal may not be received (recognized) even by a terminal configured to receive a channel and/or signal transmitted from the LAA cell. That is, the reservation signal is transmitted, when a channel and/or signal cannot be transmitted after performing the CCA, so that the LAA cell which performed the CAA assures (reserves) the frequency.

A channel and/or signal different from a channel and/or signal transmitted in the symbol in which a channel and/or signal is transmitted may be mapped to the symbol in which the reservation signal is transmitted. That is, a channel and/or signal mapped to the symbol in which the reservation signal is transmitted is recognized (received) by the terminal. For example, the terminal identifies, on the basis of the channel and/or signal mapped to the symbol in which the reservation signal is transmitted, the symbol in which a channel and/or signal is transmitted. Furthermore, the terminal synchronizes with the LAA cell (identifies the LAA cell), by using a channel and/or signal mapped to the symbol in which the reservation signal is transmitted, for example.

FIG. 7 is a diagram illustrating an example of a communication procedure in a certain LAA cell. The difference from the description in FIG. 5 will be described below. In this example, similarly to an example of FIG. 5, the CCA is performed in the symbol #5 in the subframe #3. Further, a case is assumed where the LAA cell determines that the frequency is in an idle state in the CCA, and can start transmitting a signal in a symbol next to the current symbol. In FIG. 7, the LAA cell transmits a signal from the symbol #6 in the subframe #3 to the symbol #5 in the subframe #7 which is 4 ms after the subframe #3.

In an example of FIG. 7, the LAA cell starts transmission of the reservation signal in a symbol next to the symbol in which the CCA is performed and ends the transmission in the last symbol, in a subframe including a symbol in which the CCA is performed. Furthermore, the LAA cell transmits a channel and/or signal, in the next subframe of the subframe including the symbol in which the CCA is performed. Moreover, the reservation signal in FIG. 7 includes the reservation signal described in FIG. 6.

For example, in FIG. 7, the terminal can assume that a channel and/or signal is transmitted in the subframe #4 and/or the subframes following the subframe #4. Thus, the terminal assumes that a channel and/or signal is transmitted from the first symbol of the subframe. Therefore, the base station including the LAA cell can use, for the terminal, a method similar to the conventional method in terms of transmission of a channel and/or signal, and the notification of control information for a channel and/or signal.

Furthermore, in FIG. 7, the LAA cell can transmit, in the subframe #7, a channel and/or signal from the first symbol to the symbol #5. For example, the LAA cell can transmit, to the terminal, the PDSCH and/or the EPDCCH mapped to the resource in from a predetermined symbol to the symbol #5 in the subframe #7. Furthermore, the LAA cell can transmit, to the terminal, the PDCCH mapped to the resource in from the first symbol to the predetermined symbol in the subframe #7. For example, the predetermined symbol is determined on the basis of information transmitted on the PCFICH and on the number of OFDM symbols used for transmitting the PDCCH. Furthermore, the predetermined symbol is determined on the basis of information which is control information configured by the RRC signaling, and is information indicating an OFDM start symbol for the EPDCCH, the PDSCH scheduled by the PDCCH, and the PDSCH scheduled by the EPDCCH, for example.

Moreover, in FIG. 7, the LAA cell can notify the terminal of the last symbol in which a channel and/or signal is transmitted, or configure the last symbol for the terminal, in the subframe #7. In a certain subframe in the LAA cell, information for the terminal to recognize the last symbol and a method for notifying the information can use the method described in an example of FIG. 5. The method described in an example of FIG. 5 is information for recognizing a symbol in which a channel and/or signal is transmitted, and a method for notifying the information in FIG. 5. For example, the LAA cell includes information on the last symbol in the DCI notified on the PDCCH or the EPDCCH transmitted in the subframe #7. Thus, the LAA cell can use, like in the subframe #7 in FIG. 7, the resource efficiently, when a channel and/or signal can end transmitting a signal in any symbol in the subframe. Furthermore, the LAA cell includes the information on the last symbol in information configured by the RRC signaling or the MAC signaling, for example.

Moreover, in FIG. 7, although a method in which the transmission method in the subframe #3 and the transmission method in the subframe #7 are used in combination has been described, it is not limited thereto. The transmission methods in the subframe #3 and in the subframe #7 may be used independently. Furthermore, some of or all the methods described in FIGS. 5 to 7 may be used in combination.

Furthermore, in the subframe #7 in FIG. 7, mapping the PDCCH, EPDCCH and/or PDSCH to a resource element may be different from the mapping in other subframes.

Moreover, in the LAA cell, a subframe capable of transmitting a channel and/or signal to all OFDM symbols in one subframe (that is, the subframes from #4 to #6 in FIGS. 5 to 7) may be recognized, configured, or notified as a subframe different from a subframe not capable of transmitting a channel and/or signal to some OFDM symbols in one subframe (that is, the subframe #3 in FIGS. 5 to 7, and the subframe #7 in FIG. 7). For example, a subframe capable of transmitting a channel and/or signal to all OFDM symbols in one subframe is equivalent to a subframe in the conventional serving cell.

In the present embodiment, a subframe not capable of transmitting a channel and/or signal to all OFDM symbols in one subframe is also referred to as "first LAA subframe." A subframe not capable of transmitting a channel and/or signal to some OFDM symbols in one subframe is also referred to as "second LAA subframe." A subframe capable of transmitting a channel and/or signal to all OFDM symbols in one subframe is also referred to as "third LAA subframe."

Furthermore, the method described in the present embodiment can be employed for a method for recognizing, by the terminal, the first LAA subframe, the second LAA subframe, and the third LAA subframe. For example, a method for recognizing the subframe uses information for recognizing a symbol in which a channel and/or signal is transmitted, and a notification method thereof.

Furthermore, the method for the terminal to recognize the first LAA subframe, the second LAA subframe, and the third LAA subframe may be explicitly notified or configured by the PDCCH signaling or the RRC signaling.

Moreover, the method for recognizing, by the terminal, the first LAA subframe, the second LAA subframe, and the third LAA subframe may be implicitly notified or configured on the basis of information (parameter) notified or configured by the PDCCH signaling or the RRC signaling. For example, the terminal recognizes the first LAA subframe, the second LAA subframe, and the third LAA subframe, on the basis of information on mapping of a CRS.

Furthermore, when the terminal recognizes that a certain subframe is the second LAA subframe, the terminal recognizes that a predetermined number of subframes following the certain subframe is the third LAA subframe. Moreover, the terminal recognizes the subframe following the last subframe that is recognized as the third LAA subframe as the first subframe until the subframe following the next subframe of the last subframe that is recognized as the third LAA subframe is recognized as the second LAA subframe. Moreover, the predetermined number (that is, the number of subframes to be recognized as the third LAA subframe) may be predefined. The predetermined number may be configured in the LAA cell. The predetermined number may be notified by the channel and/or signal mapped to the second LAA subframe.

Furthermore, in the second LAA subframe and the third LAA subframe, start symbols of the PDSCH and/or the EPDCCH are independently defined or configured.

Furthermore, in FIGS. 5 to 7, it is illustrated that the CCA is performed in one subframe, but a time (period) during which the CCA is performed is not limited thereto. A time during which the CCA is performed may vary for each LAA cell, each CCA timing, and each execution of CCA. For example, the CCA is performed in a time based on a predetermined time slot (time interval, time domain). The predetermined time slot may be defined or configured by a time obtained by dividing one subframe into a predetermined number. The predetermined time slot may be defined or configured by a predetermined number of subframes.

Furthermore, in the present embodiment, the size of a field in the time domain, such as a time (time slot) during which the CCA is performed or a time during which a channel and/or signal is transmitted (can be transmitted) in a certain subframe, can be represented by using a predetermined time unit. For example, the size of the field in the time domain is represented as several time units Ts. Ts is 1/(15000*2048) seconds. For example, the time of one subframe is 30720*Ts (1 ms).

Furthermore, like in the subframe #3 in FIGS. 5 to 7, whether or not the LAA cell can start transmitting a channel and/or signal (including a reservation signal) in any symbol in a certain subframe may be configured to the terminal or the LAA cell. For example, information indicating whether or not such transmission is possible, in the configuration for the LAA cell, is configured to the terminal by the RRC signaling. The terminal switches, on the basis of the information, the process related to reception (monitoring, recognition, decoding) in the LAA cell.

Furthermore, all subframes in the LAA cell may be a subframe in which the LAA cell can start transmission in any symbol in the subframe (including a subframe in which the LAA cell can end transmission in any symbol therein). Moreover, a subframe in which the LAA cell can start transmission in any symbol in the subframe may be a predefined subframe or a configured subframe for the LAA cell.

Furthermore, a subframe in which the LAA cell can start transmission in any symbol in the subframe (including a subframe in which the LAA cell can end transmission in any symbol therein) can be configured, notified, or determined, on the basis of an uplink/downlink configuration (UL/DL configuration) of the TDD. For example, such a subframe is a subframe notified (designated) as a special subframe in the UL/DL configuration. The special subframe in the LAA cell is a subframe including at least one of three fields of a downlink pilot time slot (DwPTS), a guard period (GP), and an uplink pilot time slot (UpPTS). The configuration for the special subframe in the LAA cell may be configured or notified by RRC signaling, or PDCCH or EPDCCH signaling. This configuration configures the time length for at least one of the DwPTS, GP, and UpPTS. Furthermore, this configuration is index information indicating a predefined candidate time length. Moreover, this configuration can use the same time length as those of the DwPTS, GP, and UpPTS used in a special subframe configuration configured for a conventional TDD cell. That is, the time length during which transmission is possible in a certain subframe is decided, on the basis of any of the DwPTS, GP, and UpPTS.

Furthermore, in the present embodiment, the reservation signal can be a signal that can be received by an LAA cell which is different from an LAA cell transmitting the reservation signal. For example, the LAA cell which is different from the LAA cell transmitting the reservation signal is an LAA cell (adjacent LAA cell) adjacent to the LAA cell transmitting the reservation signal. For example, the reservation signal includes information on a transmission status (usage) in a predetermined subframe and/or symbol in the LAA cell. When the LAA cell which is different from the LAA cell transmitting a certain reservation signal receives the reservation signal, the LAA cell that receives the reservation signal recognizes the transmission status in the predetermined subframe and/or symbol, and performs scheduling according to the status, on the basis of the reservation signal.

Furthermore, the LAA cell that receives the reservation signal may perform LBT before transmitting a channel and/or signal. The LBT is performed on the basis of the received reservation signal. For example, in the LBT, scheduling including resource allocation, selection of the MCS, or the like is performed, in consideration of the channel and/or signal to be transmitted (assumed to be transmitted) by the LAA cell which transmits the reservation signal.

Furthermore, when the LAA cell that receives the reservation signal performs the scheduling for transmitting a channel and/or signal on the basis of the reservation signal, one or more LAA cells including the LAA cell that transmits the reservation signal can be notified of information on the scheduling, by a predetermined method. For example, the predetermined method is a method of transmitting a predetermined channel and/or signal including a reservation signal. Furthermore, the predetermined method is a method of notifying the information through a backhaul such as an X2 interface, for example.

Moreover, in the carrier aggregation and/or the dual connectivity, a conventional terminal can configure up to five serving cells; however, the terminal according to the present embodiment can expand the maximum number of serving cells that can be configured. That is, the terminal according to the present embodiment can configure more than five serving cells. For example, the terminal according to the present embodiment can configure up to 16 or 32 serving cells. For example, more than five serving cells configured for the terminal according to the present embodiment include the LAA cell. Furthermore, more than five serving cells configured for the terminal according to the present embodiment may be all LAA cells.

Moreover, when more than five serving cells can be configured, the configuration for some serving cells may be different from the configuration for the conventional serving cell (that is, the conventional secondary cell). For example, followings are different in terms of the configuration. The configuration described below may be used in combination.

(1) In the terminal, the conventional serving cells are configured up to 5, and the serving cells which are different from the conventional serving cells are configured up to 11 or 27. That is, in the terminal, in addition to the conventional primary cells, the conventional secondary cells are configured up to 4, and the secondary cells which are different from the conventional secondary cells are configured up to 11 or 27.

(2) The configuration for the serving cell (secondary cell) that are different from the conventional serving cell (secondary cell) includes the configuration for the LAA cell. For example, in the terminal, in addition to the conventional primary cell, the secondary cells which do not include the configuration for the LAA cell are configured up to 4, and the secondary cell which are different from the conventional secondary cells are configured up to 11 or 27.

Furthermore, when more than five serving cells can be configured, the base station (including the LAA cell) and/or the terminal can perform process or assumption that are different from the case where up to five serving cells are configured. For example, the followings are different in terms of the process or the assumption. The processes or the assumptions described below may be used in combination.

(1) Even when more than five serving cells are configured, the terminal assumes that the PDCCH, EPDCCH and/or PDSCH is simultaneously transmitted (received) from a maximum of five serving cells. Thus, the terminal can use a method similar to the conventional method for reception of the PDCCH, EPDCCH and/or PDSCH, and transmission of the HARQ-ACK for the PDSCH.

(2) When more than five serving cells are configured, the terminal configures a combination (group) of cells that perform bundling for the HARQ-ACK for the PDSCH, in the serving cells. For example, all serving cells, all secondary cells, all LAA cells, or all secondary cells which are different from the conventional secondary cell each include information (configuration) on the bundling for the HARQ-ACK between serving cells. For example, the information on the bundling for the HARQ-ACK between serving cells is an identifier (index, ID) for the bundling. For example, the HARQ-ACK is bundled across cells with the same identifier used for the bundling. The bundling is performed by a logical AND operation on the target HARQ-ACK. Furthermore, the maximum number of the identifiers for the bundling can be five. Moreover, the maximum number of the identifiers for bundling can be five including the number of cells not performing the bundling. That is, the number of groups that perform the bundling across serving cells can be a maximum of five. Thus, the terminal can use a method similar to the conventional method for reception of the PDCCH, EPDCCH and/or PDSCH, and transmission of the HARQ-ACK for the PDSCH.

(3) When more than five serving cells are configured, the terminal configures a combination (group) of the cells that perform multiplexing of the HARQ-ACK for the PDSCH, in the serving cells. When the combination (group) of the cells that perform multiplexing of the HARQ-ACK for the PDSCH is configured, the multiplexed HARQ-ACK is transmitted by the PUCCH or the PUSCH on the basis of the group. In each group, the maximum number of multiplexed serving cells are defined or configured. The maximum number is defined or configured on the basis of the maximum number of the serving cells configured for the terminal. For example, the maximum number is equal to the maximum number of the serving cells configured for the terminal, or is half of the maximum number of the serving cells configured for the terminal. Furthermore, the maximum number of the PUCCHs transmitted simultaneously is defined or configured, on the basis of the maximum number of the serving cells multiplexed in each group, and the maximum number of the serving cells configured for the terminal.

In other words, the number of first serving cells (that is, the primary cells and/or the secondary cells) to be configured is equal to or less than the predetermined number (that is, five), and the total of the first serving cells and the second serving cells to be configured exceeds the predetermined number.

Next, terminal capability related to LAA will be described. The terminal notifies (transmits to) the base station, on the basis of an instruction from the base station, of information on the capability of the terminal (terminal capability), by the RRC signaling. The terminal capability for a certain function (feature) is notified (transmitted) when the function (feature) is supported, and not notified (transmitted) when the function (feature) is not supported. Furthermore, the terminal capability for a certain function (feature) may be information indicating whether or not the function (feature) has been tested and/or implemented. For example, the terminal capability in the present embodiment is as follows. The terminal capability described below may be used in combination.

(1) The terminal capability related to support for the LAA cell and the terminal capability related to support for the configuration of more than five serving cells are independently defined. For example, the terminal supporting the LAA cell supports the configuration of more than five serving cells. That is, the terminal not supporting the configuration of more than five serving cells does not support the LAA cell. In that case, the terminal supporting the configuration of more than five serving cells may or may not support the LAA cell.

(2) The terminal capability related to support for the LAA cell and the terminal capability related to support for the configuration of more than five serving cells are independently defined. For example, the terminal supporting the configuration of more than five serving cells supports the LAA cell. That is, the terminal not supporting the LAA cell does not support the configuration of more than five serving cells. In that case, the terminal supporting the LAA cell may or may not support the configuration of more than five serving cells.

(3) The terminal capability related to the downlink in the LAA cell and the terminal capability related to the uplink in the LAA cell are independently defined. For example, the terminal supporting the uplink in the LAA cell supports the downlink in the LAA cell. That is, the terminal not supporting the downlink in the LAA cell does not support the uplink in the LAA cell. In that case, the terminal supporting the downlink in the LAA cell may or may not support the uplink in the LAA cell.

(4) The terminal capability related to the support for the LAA cell includes support for a transmission mode configured only for the LAA cell.

(5) The terminal capability related to the downlink in the configuration of more than five serving cells and the terminal capability related to the uplink in the configuration of more than five serving cells are independently defined. For example, the terminal supporting the uplink in the configuration of more than five serving cells supports the downlink in the configuration of more than five serving cells. That is, the terminal not supporting the downlink in the configuration of more than five serving cells does not support the uplink in the configuration of more than five serving cells. In that case, the terminal supporting the downlink in the configuration of more than five serving cells may or may not support the uplink in the configuration of more than five serving cells.

(6) In the terminal capability in the configuration of more than five serving cells, a terminal capability supporting a configuration of a maximum of 16 downlink serving cells (component carriers) and a terminal capability supporting a configuration of a maximum of 32 downlink serving cells are independently defined. Furthermore, the terminal supporting the configuration of a maximum of 16 downlink serving cells supports the configuration of at least one uplink serving cell. The terminal supporting the configuration of a maximum of 32 downlink serving cells supports the configuration of at least two uplink serving cells. That is, the terminal supporting the configuration of a maximum of 16 downlink serving cells need not support the configuration of two or more uplink serving cells.

(7) The terminal capability related to the support for the LAA cell is notified on the basis of the frequency (band) used in the LAA cell. For example, in a notification of a frequency or a combination of frequencies supported by the terminal, when the notified frequency or combination of frequencies includes at least one frequency used in the LAA cell, the terminal implicitly notifies information that the terminal supports the LAA cell. That is, when the notified frequency or combination of frequencies does not include the frequency used in the LAA cell at all, the terminal implicitly notifies information that the terminal does not support the LAA cell.

Furthermore, in the present embodiment, a case where the LAA cell transmits the PDCCH or the EPDCCH for notifying the DCI for the PDSCH transmitted in the LAA cell (that is, a case of self scheduling) has been described; however, the method described in the present embodiment is not limited thereto. For example, even in a case where a serving cell that is different from the LAA cell transmits the PDCCH or the EPDCCH for notifying the DCI for the PDSCH transmitted in the LAA cell (that is, a case of cross carrier scheduling), the method described in the present embodiment can be applied.

Furthermore, in the present embodiment, the information for recognizing a symbol in which a channel and/or signal is transmitted may be based on a symbol in which no channel and/or signal is transmitted. For example, the information is information indicating the last symbol of symbols in which no channel and/or signal is transmitted. Furthermore, the information for recognizing a symbol in which a channel and/or signal is transmitted may be determined on the basis of another information or a parameter.

Moreover, in the present embodiment, a symbol in which a channel and/or signal is transmitted may be independently configured (notified, defined) for a channel and/or signal. That is, the information for recognizing a symbol in which a channel and/or signal is transmitted and the notification method thereof can be independently configured (notified, defined) for a channel and/or signal. For example, the information for recognizing a symbol in which a channel and/or signal is transmitted and the notification method thereof can be independently configured (notified, defined) for the PDSCH and the EPDCCH.

Furthermore, in the present embodiment, a symbol/subframe in which no channel and/or signal is transmitted (cannot be transmitted) may be, from the point of view of the terminal, a symbol/subframe in which a channel and/or signal is not assumed to be transmitted (can be transmitted). That is, the terminal can assume that the LAA cell does not transmit a channel and/or signal in the symbol/subframe.

Furthermore, in the present embodiment, a symbol/subframe in which a channel and/or signal is transmitted (can be transmitted) may be, from the point of view of the terminal, a symbol/subframe in which a channel and/or signal may be assumed to be transmitted. That is, the terminal can assume that the LAA cell may or may not transmit a channel and/or signal in the symbol/subframe.

Furthermore, in the present embodiment, a symbol/subframe in which a channel and/or signal is transmitted (can be transmitted) may be, from the point of view of the terminal, a symbol/subframe in which a channel and/or signal is assumed to be always transmitted. That is, the terminal can assume that the LAA cell always transmits a channel and/or signal in the symbol/subframe.

Furthermore, in other words, some of the description in the present embodiment are as follows.

A terminal device configured to communicate with a base station device, includes: a higher layer processing unit configured to configure at least one first serving cell (such as primary cell and/or secondary cell) and at least one second serving cell (such as LAA cell); and a reception unit configured to receive a physical downlink shared channel in the first serving cell and/or the second serving cell. Mapping of the physical downlink shared channel in the first serving cell ends with the last OFDM symbol in all subframes, and mapping of the physical downlink shared channel in the second serving cell ends with the first OFDM symbol in a predetermined subframe.

The reception unit receives, in the predetermined subframe of the second serving cell, a physical downlink control channel whose mapping ends with the second OFDM symbol, or an enhanced physical downlink control channel whose mapping ends with the first OFDM symbol. The physical downlink control channel or the enhanced physical downlink control channel include a downlink control information format used for scheduling the physical downlink shared channel.

The first OFDM symbol is notified by information transmitted by using the downlink control information format.

The first OFDM symbol and the second OFDM symbol are configured independently by higher layer signaling.

The reception unit receives, in each of a predetermined number of subframes before the predetermined subframe, the physical downlink shared channel whose mapping ends with the last OFDM symbol.

The first OFDM symbol is notified by using a DwPTS in a special subframe of a TDD cell.

The base station device configured to communicate with the terminal device, includes: a higher layer processing unit configured to configure at least one first serving cell and at least one second serving cell in the terminal device, and a transmission unit configured to transmit a physical downlink shared channel in the first serving cell and/or the second serving cell. Mapping of the physical downlink shared channel in the first serving cell ends with the last OFDM symbol, in all subframes. Mapping of the physical downlink shared channel in the second subframe ends with the first OFDM symbol in the predetermined subframe.

The terminal device configured to communicate with the base station device, includes: a higher layer processing unit configured to configure at least one first serving cell and at least one second serving cell, and a reception unit configured to receive a physical downlink shared channel in the first serving cell and/or the second serving cell. The physical downlink shared channel in the first serving cell is mapped, in all subframes, to the first OFDM symbol and/or symbols following the first OFDM symbol configured by higher layer signaling. The physical downlink shared channel in the second subframe is mapped to the second symbol and/or symbols following the second OFDM symbol in a predetermined subframe.

The reception unit receives, in a predetermined subframe of the second serving cell, an enhanced physical downlink control channel mapped to a third OFDM symbol and/or symbols following the third OFDM symbol. The enhanced physical downlink control channel includes a downlink control information format used for scheduling the physical downlink shared channel.

The second OFDM symbol is notified by information transmitted by using the downlink control information format.

The second OFDM symbol and the third OFDM symbol are configured independently by the higher layer signaling.

The reception unit receives, in each of a predetermined number of subframes subsequent to the predetermined subframe, the PDSCH mapped to from the first OFDM symbol to the last OFDM symbol.

The base station device configured to communicate with the terminal device, includes: a higher layer processing unit configured to configure at least one first serving cell and at least one second serving cell in the terminal device, and a transmission unit configured to transmit a physical downlink shared channel in the first serving cell and/or the second serving cell. The physical downlink shared channel in the first serving cell is mapped, in all subframes, to the first OFDM symbol and/or symbols following the first OFDM symbol configured by the higher layer signaling. The physical downlink shared channel in the second serving cell is mapped to the second OFDM symbol and/or symbols following the second OFDM symbol in the predetermined subframe.

The terminal device configured to communicate with the base station device, includes: a higher layer processing unit configured to configure at least one first serving cell and at least one second serving cell. Any one of the first serving cells is a primary cell. The first serving cells other than the primary cell is a secondary cell. The second serving cell is a secondary cell. The configuration of the secondary cell which is the second serving cell is different from the configuration of the secondary cell which is the first serving cell.

The frequency that can be configured for the first serving cell is different from the frequency that can be configured for the second serving cell.

The second serving cell is different from the first serving cell in terms of assumption of a signal and/or channel in an activated state.

In the second serving cell, the assumption of a signal and/or channel in an activated state is determined for each subframe.

In the predetermined subframe of the second serving cell, no signal and/or channel is mapped to a predetermined OFDM symbol configured by the higher layer signaling.

The number of first serving cells to be configured is equal to or less than a predetermined number, and the total of the first serving cells and the second serving cells to be configured exceeds the predetermined number.

In the first serving cell, a downlink channel and an uplink channel are supported. In the second serving cell, only the downlink channel is supported.

The base station device configured to communicate with the terminal device, includes: a higher layer processing unit configured to configure at least one first serving cell and at least one second serving cell in the terminal device. Any one of the first serving cells is a primary cell. The first serving cell other than the primary cell is a secondary cell. The second serving cell is a secondary cell. The configuration of the secondary cell which is the second serving cell is different from the configuration of the secondary cell which is the first serving cell.

Moreover, although the description has been given in each of the above-described embodiments by using the terms "primary cell" and "PS cell", these terms need not always be used. For example, "primary cell" in each of the above-described embodiments may be referred to as "master cell", and "PS cell" in each of the above-described embodiments may be referred to as "primary cell."

A program running on each of the base station device 2 and the terminal device 1 according to the present invention may be a program that controls a central processing unit (CPU) and the like (a program for causing a computer to operate) in such a manner as to realize the functions in the above-described embodiments according to the present invention. The information handled in these devices is temporarily stored in a random access memory (RAM) while being processed. Thereafter, the information is stored in various types of read only memory (ROM) such as a flash ROM and a hard disk drive (HDD) and when necessary, is read by the CPU to be modified and written.

Moreover, the terminal device 1 and the base station device 2-1 or the base station device 2-2 according to the above-described embodiments may be partially realized by the computer. This configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 2-1 or the base station device 2-2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 2-1 or the base station device 2-2 according to the above-described embodiments can be realized as an aggregation (a device group) constituted of a plurality of devices. Devices constituting the device group may be each equipped with some or all portions of each function or each functional block of the base station device 2-1 or base station device 2-2 according to the above-described embodiments. It is only required that the device group itself include general functions or general functional blocks of the base station device 2-1 or the base station device 2-2. Furthermore, the terminal device 1 according to the above-described embodiments can also communicate with the base station device as the aggregation.

Furthermore, the base station device 2-1 or the base station device 2-2 according to the above-described embodiments may be an evolved universal terrestrial radio access network (EUTRAN). Furthermore, the base station device 2-1 or the base station device 2-2 according to the above-described embodiments may have some or all portions of a function of a higher node for an eNodeB.

Furthermore, some or all portions of each of the terminal device 1 and the base station device 2-1 or the base station device 2-2 according to the above-described embodiments may be typically realized as a large-scale integration (LSI) that is an integrated circuit or may be realized as a chip set. The functional blocks of each of the terminal device 1 and the base station device 2-1 or the base station device 2-2 may be individually realized as a chip, or some or all the functional blocks may be integrated into a chip. Furthermore, a circuit integration technique is not limited to the LSI, and may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal device or a communication device, but the present invention is not limited to this, and is applicable to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

SUMMARY (1) To accomplish the object described above, the present invention is contrived to provide the following means. That is, a terminal device according to an aspect of the present invention is configured to communicate with a base station device. The terminal device includes a higher layer processing unit configured to configure at least one first serving cell and at least one second serving cell. Any one of the first serving cells is a primary cell, the first serving cell other than the primary cell is a secondary cell, and the second serving cell is a secondary cell. The configuration of the secondary cell which is the second serving cell is different from the configuration of the secondary cell which is the first serving cell.

(2) Furthermore, the terminal device according to an aspect of the present invention is the above described terminal device. The frequency that can be configured for the first serving cell is different form the frequency that can be configured for the second serving cell.

(3) Moreover, the terminal device according to an aspect of the present invention is the above described terminal device. The second serving cell is different from the first serving cell in terms of an assumption of a signal and/or channel in an activated state.

(4) Furthermore, the terminal device according to an aspect of the present invention is the above described terminal device. In the second serving cell, the assumption of a signal and/or channel in an activated state is determined for each subframe.

(5) Moreover, the terminal device according to an aspect of the present invention is the above described terminal device. In a predetermined subframe of the second serving cell, no signal and/or channel is mapped to a predetermined OFDM symbol configured by higher layer signaling.

(6) Furthermore, the terminal device according to an aspect of the present invention is the above described terminal device. The number of first serving cells to be configured is equal to or less than a predetermined number, and the total of the first serving cells and the second serving cells to be configured exceeds the predetermined number.

(7) Moreover, the terminal device according to an aspect of the present invention is the above described terminal device. In the first serving cell, the downlink channel and the uplink channel are supported. In the second serving cell, only the downlink channel is supported.

(8) Furthermore, a base station device according to an aspect of the present invention is configured to communicate with the terminal device. The base station device includes a higher layer processing unit configured to configure at least one first serving cell and at least one second serving cell in the terminal device. Any one of the first serving cells is a primary cell, the first serving cell other than the primary cell is a secondary cell, and the second serving cell is a secondary cell. The configuration of the secondary cell which is the second serving cell is different from the configuration of the secondary cell which is the first serving cell.

(9) Furthermore, the base station device according to an aspect of the present invention is the above described base station device. The frequency that can be configured for the first serving cell is different from the frequency that can be configured for the second serving cell.

(10) Moreover, the base station device according to an aspect of the present invention is the above described base station device. The second serving cell is different from the first serving cell in terms of an assumption of a signal and/or channel in an activated state.

(11) Furthermore, the base station device according to an aspect of the present invention is the above described base station device. In the second serving cell, the assumption of a signal and/or channel in an activated state is determined for each subframe.

(12) Moreover, the base station device according to an aspect of the present invention is the above described base station device. In a predetermined subframe of the second serving cell, no signal and/or channel is mapped to a predetermined OFDM symbol configured by higher layer signaling.

(13) Furthermore, the base station device according to an aspect of the present invention is the above described base station device. The number of first serving cells to be configured is equal to or less than a predetermined number, and the total of the first serving cells and the second serving cells to be configured exceeds the predetermined number.

(14) Moreover, the base station device according to an aspect of the present invention is the above described base station device. In the first serving cell, a downlink channel and an uplink channel are supported. In the second serving cell, only the downlink channel is supported.

(15) Furthermore, a communication method according to an aspect of the present invention is used by a terminal device configured to communicate with a base station device. The method includes a step of: configuring at least one first serving cell and at least one second serving cell. Any one of the first serving cells is a primary cell, the first serving cell other than the primary cell is a secondary cell, and the second serving cell is a secondary cell. The configuration of the secondary cell which is the second serving cell is different from the configuration of the secondary cell which is the first serving cell.

(16) Moreover, the communication method according to an aspect of the present invention is used by a base station device configured to communicate with a terminal device. The method includes a step of: configuring at least one first serving cell and at least one second serving cell in the terminal device. Any one of the first serving cells is a primary cell, the first serving cell other than the primary cell is a secondary cell, and the second serving cell is a secondary cell. The configuration of the secondary cell which is the second serving cell is different from the configuration of the secondary cell which is the first serving cell.

REFERENCE SIGNS LIST

501 Higher
502 Control unit
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606, 1006 Control
607, 1007 Higher layer
608 Channel state measurement unit
609, 1009 Uplink subframe generation unit
610 Uplink control information generation unit
611, 612, 1011 SC-FDMA signal transmission unit
613, 614, 1013 Transmit antenna

The invention claimed is:

1. A terminal device comprising:
a processor; and
a memory storing instructions that cause the processor to:
detect a physical downlink control channel (PDCCH) having downlink control information (DCI), wherein
if the terminal device detects the PDCCH in a subframe of a secondary cell in which a frame structure type 3 is used, the terminal device assumes a configuration of occupied OFDM symbols in the subframe of the secondary cell according to a field in the detected DCI of the PDCCH in the subframe,
the occupied OFDM symbols are used for a transmission of a downlink physical channel and/or a downlink physical signal,
the terminal device assumes that consecutive OFDM symbols, which are the occupied OFDM symbols and are constituted by (a) the earliest OFDM symbol in the subframe and (b) a subsequent OFDM symbol(s) in the subframe, are used for the transmission in the subframe, a total number of the consecutive OFDM symbols being determined corresponding to a value of the field, and
the value of the field indicates that (i) the consecutive OFDM symbols are used for the transmission in the subframe and (ii) other OFDM symbols in the subframe are not used for any transmission in the subframe.

2. The terminal device according to claim 1, wherein downlink transmissions including the transmission of the downlink physical channel and/or the downlink physical signal occupy one or more consecutive subframes.

3. The terminal device according to claim 1, wherein the subframe follows one of DwPTS durations.

4. The terminal device according to claim 1, wherein the frame structure type 3 is applicable to a Licensed-Assisted Access (LAA) secondary cell.

5. The terminal device according to claim 1, wherein, in the frame structure type 3, 10 subframes within a radio frame are available for downlink transmissions including the transmission of the downlink physical channel and/or the downlink physical signal.

6. A base station device comprising:
a processor; and
a memory storing instructions that cause the processor to:
transmit a physical downlink control channel (PDCCH) having downlink control information (DCI) in a subframe of a secondary cell in which a frame structure type 3 is used; and
configure a field in the DCI of the PDCCH which causes, a terminal device having detected the PDCCH in the subframe, to assume a configuration of occupied OFDM symbols in the subframe of the secondary cell, wherein
the occupied OFDM symbols are used for a transmission of a downlink physical channel and/or a downlink physical signal,
consecutive OFDM symbols, which are the occupied OFDM symbols and are constituted by (a) the earliest OFDM symbol in the subframe and (b) a subsequent OFDM symbol(s) in the subframe, are used for the transmission in the subframe, a total number of the consecutive OFDM symbols being determined corresponding to a value of the field, and
the value of the field indicates that (i) the consecutive OFDM symbols are used for the transmission in the subframe and (ii) other OFDM symbols in the subframe are not used for any transmission in the subframe.

7. The base station device according to claim 6, wherein downlink transmissions including the transmission of the downlink physical channel and/or the downlink physical signal occupy one or more consecutive subframes.

8. The base station device according to claim 6, wherein the subframe follows one of DwPTS durations.

9. The base station device according to claim 6, wherein the frame structure type 3 is applicable to a Licensed-Assisted Access (LAA) secondary cell.

10. The base station device according to claim 6, wherein, in the frame structure type 3, 10 subframes within a radio frame are available for downlink transmissions including the transmission of the downlink physical channel and/or the downlink physical signal.

11. A communication method used in a terminal device, comprising the steps of:
- detecting a physical downlink control channel (PDCCH) having downlink control information (DCI); and
- determining, if the terminal device detects the PDCCH in a subframe of a secondary cell in which a frame structure type 3 is used, a configuration of occupied OFDM symbols in the subframe of the secondary cell according to a field in the detected DCI of the PDCCH in the subframe, wherein
- the occupied OFDM symbols are used for a transmission of a downlink physical channel and/or a downlink physical signal,
- the terminal device assumes that consecutive OFDM symbols, which are the occupied OFDM symbols and are constituted by (a) the earliest OFDM symbol in the subframe and (b) a subsequent OFDM symbol(s) in the subframe, are used for the transmission in the subframe, a total number of the consecutive OFDM symbols being determined corresponding to a value of the field, and
- the value of the field indicates that (i) the consecutive OFDM symbols are used for the transmission in the subframe and (ii) other OFDM symbols in the subframe are not used for any transmission in the subframe.

12. A communication method used in a base station device, comprising the steps of:
- transmitting a physical downlink control channel (PDCCH) having downlink control information (DCI) in a subframe of a secondary cell in which a frame structure type 3 is used; and
- configuring a field in the DCI of the PDCCH which causes, a terminal device having detected the PDCCH in the subframe, to assume a configuration of occupied OFDM symbols in the subframe of the secondary cell, wherein
- the occupied OFDM symbols are used for a transmission of a downlink physical channel and/or a downlink physical signal,
- consecutive OFDM symbols, which are the occupied OFDM symbols and are constituted by (a) the earliest OFDM symbol in the subframe and (b) a subsequent OFDM symbol(s) in the subframe, are used for the transmission in the subframe, a total number of the consecutive OFDM symbols being determined corresponding to a value of the field, and
- the value of the field indicates that (i) the consecutive OFDM symbols are used for the transmission in the subframe and (ii) other OFDM symbols in the subframe are not used for any transmission in the subframe.

* * * * *